US011477477B2

(12) United States Patent
Chen et al.

(10) Patent No.: US 11,477,477 B2
(45) Date of Patent: Oct. 18, 2022

(54) SUB-PREDICTION UNIT BASED ADVANCED TEMPORAL MOTION VECTOR PREDICTION

(71) Applicant: QUALCOMM Incorporated, San Diego, CA (US)

(72) Inventors: Ying Chen, San Diego, CA (US); Xiang Li, San Diego, CA (US); Hongbin Liu, San Diego, CA (US); Jianle Chen, San Diego, CA (US); Li Zhang, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1785 days.

(21) Appl. No.: 15/005,564

(22) Filed: Jan. 25, 2016

(65) Prior Publication Data

US 2016/0219278 A1   Jul. 28, 2016

Related U.S. Application Data

(60) Provisional application No. 62/107,933, filed on Jan. 26, 2015.

(51) Int. Cl.
*H04N 7/12*   (2006.01)
*H04N 19/56*   (2014.01)
(Continued)

(52) U.S. Cl.
CPC ........... *H04N 19/56* (2014.11); *H04N 19/105* (2014.11); *H04N 19/176* (2014.11); *H04N 19/46* (2014.11);
(Continued)

(58) Field of Classification Search
CPC .. H04N 19/139; H04N 19/115; H04N 19/174; H04N 19/56; H04N 19/105;
(Continued)

(56) References Cited

U.S. PATENT DOCUMENTS

2012/0287999 A1   11/2012   Li et al.
2013/0188720 A1   7/2013   Wang et al.
(Continued)

FOREIGN PATENT DOCUMENTS

CN   103841425 A   6/2014
CN   103931196 A   7/2014
(Continued)

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
(Continued)

*Primary Examiner* — Y Lee
(74) *Attorney, Agent, or Firm* — Shumaker & Sieffert, P.A.

(57) ABSTRACT

In one example, a device for coding video data includes a memory configured to store video data and a video coder configured to form, for a current block of the video data, a merge candidate list including a plurality of merge candidates, the plurality of merge candidates including four spatial neighboring candidates from four neighboring blocks to the current block and, immediately following the four spatial neighboring candidates, an advanced temporal motion vector prediction (ATMVP) candidate, code an index into the merge candidate list that identifies a merge candidate of the plurality of merge candidates in the merge
(Continued)

candidate list, and code the current block of video data using motion information of the identified merge candidate.

12 Claims, 11 Drawing Sheets

(51) Int. Cl.
    *H04N 19/46*     (2014.01)
    *H04N 19/573*     (2014.01)
    *H04N 19/70*     (2014.01)
    *H04N 19/61*     (2014.01)
    *H04N 19/51*     (2014.01)
    *H04N 19/105*     (2014.01)
    *H04N 19/503*     (2014.01)
    *H04N 19/593*     (2014.01)
    *H04N 19/176*     (2014.01)
    *H04N 19/52*     (2014.01)

(52) U.S. Cl.
    CPC ........... *H04N 19/503* (2014.11); *H04N 19/51* (2014.11); *H04N 19/52* (2014.11); *H04N 19/573* (2014.11); *H04N 19/593* (2014.11); *H04N 19/61* (2014.11); *H04N 19/70* (2014.11)

(58) Field of Classification Search
    CPC .... H04N 19/52; H04N 19/503; H04N 19/176; H04N 19/573; H04N 19/46; H04N 19/51; H04N 19/61; H04N 19/593; H04N 19/70
    USPC .................................................. 375/240.16
    See application file for complete search history.

(56) References Cited

U.S. PATENT DOCUMENTS

| | | |
|---|---|---|
| 2014/0016701 A1 | 1/2014 | Chen et al. |
| 2015/0085929 A1 | 3/2015 | Chen et al. |
| 2015/0085935 A1 | 3/2015 | Chen et al. |

FOREIGN PATENT DOCUMENTS

| | | |
|---|---|---|
| CN | 104054350 A | 9/2014 |
| WO | 2013067938 A1 | 5/2013 |
| WO | 2014055833 A1 | 4/2014 |
| WO | 2015048459 A1 | 4/2015 |

OTHER PUBLICATIONS

International Search Report and Written Opinion—PCT/US2016/014875—ISA/EPO—dated Apr. 15, 2016—16 pp.
Jianle et al., "Coding Tools Investigation for Next Generation Video Coding Based on HEVC," Optomechatronic Micro/Nano Devices and Components III: Oct. 8-10, 2007, Lausanne, Switzerland; [Proceedings of SPIE, ISSN 0277-786X], SPIE, Bellingham, Wash, vol. 9599, Sep. 22, 2015, XP060060836, DOI: 10.1117/12.2193681, ISBN: 978-1-62841-730-2, 9 pp.
Karczewicz et al., "Study of Coding Efficiency Improvements beyond HEVC," 113. MPEG Meeting; Oct. 19, 2015-Oct. 23, 2015; Geneva; (Motion Picture Expert Group or ISO/IEC JTC1/SC29/WG11), No. M37102, Oct. 15, 2015, XP030065470, 13 pp.
McCann et al., "High Efficiency Video Coding (HEVC) Encoder Description V 16 (HM16)," 109. MPEG Meeting; Jul. 2014; (Motion Picture Expert Group or ISO/IEC JTC1/SC29/WG11), No. N14703, XP030021439, 58 pp.
International Standard, "Information technology—high efficiency coding and media delivery in heterogeneous environments—Part 2: High efficiency video coding," ISO/IEC 23008-2, First edition, Dec. 1, 2013, 312 pp.
Zhang et al., "Test Model 6 of 3D-HEVC and MV-HEVC," International Organisation for Standardisation Organisation, ISO/IEC JTC1/SC29/WG11 Coding of Moving Picturesand Audio, JCT-3V and Video Subgroup, No. N13940, Nov. 2013, 52 pp.
Response to Written Opinion dated Apr. 15, 2016 from international application No. PCT/US2016/014875 filed Jul. 8, 2016, 4 pp.
Second Written Opinion from International Application No. PCT/US2016/014875, dated Jan. 2, 2017, 4 pp.
ITU-T H.263, "Series H: Audiovisual and Multimedia Systems, Infrastructure of audiovisual services—Coding of moving video, Video coding for low bit rate communication," The International Telecommunication Union. Jan. 2005, 226 pp.
ITU-T H.264, "Series H: Audiovisual and Multimedia Systems, Infrastructure of audiovisual services—Coding of moving video, Advanced video coding for generic audiovisual services," The International Telecommunication Union. Jun. 2011, 674 pp.
ITU-T H.261, "Line Transmission on Non-Telephone Signals, Video Codec for Audiovisual Services," The International Telecommunication Union. 1990, 32 pp. [Applicant notes that the year of publication is sufficiently earlier than the effective U.S. filing date and any foreign priority date so that the particular month of publication is not in issue ].
ITU-T H.262, "Transmission of Non-Telephone Signals, Information Technology—Generic Coding of Moving Pictures and Associated Audio Information: Video," The International Telecommunication Union. Jul. 1995, 211 pp.
Bross et al., "High Efficiency Video Coding (HEVC) Text Specification Draft 10 (for FDIS & Last Call)," Joint Collaborative Team on Video Coding (JCT-VC), JCTVC-L1003_v34, Jan. 2013, 310 pp.
ITU-T H.223, "Series H: Audiovisual and Multimedia Systems, Infrastructure of audiovisual services—Transmission multiplexing and synchronization, Multiplexing protocol for low bit rate multimedia communication," The International Telecommunication Union, Jul. 2001, 74 pp.
International Report on Patentability issued in International Application No. PCT/US2016/014875 dated Apr. 24, 2017, 7 pp.
Chen J., et al., "Algorithm Description of Joint Exploration Test Model 1", Joint Video Exploration Team (JVET) of ITU-T SG 16 WP 3 and ISO/IEC JTC 1/SC 29/WG 11, 1st Meeting: Geneva, CH, Oct. 19-21, 2015, No. H.266, JVET-A001, Feb. 24, 2016 (Feb. 24, 2016), XP030150000, 27 Pages, URL: http://phenix.int-evry.fr/jvet/.
McCann K., et al., "High Efficiency Video Coding (HEVC) Test Model 16 (HM 16) Improved Encoder Description", Joint Collaborative Team on Video Coding (JCT-VC) of ITU-T SG16 WP3 and ISO/IEC JTC1/SC29/WG11, JCTVC-S1002,19th Meeting: Strasbourg, FR, Oct. 17-24, 2014, 54 Pages.
McCann K., et al., "High-Efficiency Video Coding (HEVC) Encoder Description v16 (HM16)", JCTVC-R1002, 109. MPEG Meeting, Jul. 7, 2014-Nov. 7, 2014, Sapporo, (Motion Picture Expert Group or ISO/IEC JTC1/SC29/WG11), (Oct. 19, 2014), No. N14703, XP030021439, 59 Pages.
Taiwan Search Report—TW105102383—TIPO—dated Aug. 30, 2019.

SUB-PREDICTION UNIT BASED ADVANCED TEMPORAL MOTION VECTOR PREDICTION

This application claims the benefit of U.S. Provisional Application No. 62/107,933, filed Jan. 26, 2015, the entire contents of which are hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265, also referred to as High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which for some techniques may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to coding (e.g., encoding or decoding) of motion information for a block of video data. More particularly, a video coder (e.g., a video encoder or a video decoder) may be configured to code motion information for a current block (e.g., a current prediction unit (PU)) using advanced temporal motion vector prediction (ATMVP). ATMVP generally involves using a temporal motion vector to identify a corresponding prediction unit that is split into sub-PUs. Rather than splitting the current PU into sub-PUs, the temporal motion vector may simply identify the corresponding block that is split into sub-PUs, each having their own motion information, and the video coder may be configured to predict corresponding portions of the current block using the motion information of the respective sub-PUs. By avoiding actively splitting the current block, overhead signaling information may be reduced for the current block, while still achieving fine grain prediction for portions of the current block that may otherwise result from splitting the current block into sub-PUs.

In one example, a method of coding video data includes forming, for a current block of video data, a merge candidate list including a plurality of merge candidates, the plurality of merge candidates including four spatial neighboring candidates from four neighboring blocks to the current block and, immediately following the four spatial neighboring candidates, an advanced temporal motion vector prediction (ATMVP) candidate, coding an index into the merge candidate list that identifies a merge candidate of the plurality of merge candidates in the merge candidate list, and coding the current block of video data using motion information of the identified merge candidate.

In another example, a device for coding video data includes a memory configured to store video data and a video coder configured to form, for a current block of the video data, a merge candidate list including a plurality of merge candidates, the plurality of merge candidates including four spatial neighboring candidates from four neighboring blocks to the current block and, immediately following the four spatial neighboring candidates, an advanced temporal motion vector prediction (ATMVP) candidate, code an index into the merge candidate list that identifies a merge candidate of the plurality of merge candidates in the merge candidate list, and code the current block of video data using motion information of the identified merge candidate.

In another example, a device for coding video data includes means for forming, for a current block of video data, a merge candidate list including a plurality of merge candidates, the plurality of merge candidates including four spatial neighboring candidates from four neighboring blocks to the current block and, immediately following the four spatial neighboring candidates, an advanced temporal motion vector prediction (ATMVP) candidate, means for coding an index into the merge candidate list that identifies a merge candidate of the plurality of merge candidates in the merge candidate list, and means for coding the current block of video data using motion information of the identified merge candidate.

In another example, a computer-readable storage medium has stored thereon instructions that, when executed, cause a processor to form, for a current block of video data, a merge candidate list including a plurality of merge candidates, the plurality of merge candidates including four spatial neighboring candidates from four neighboring blocks to the current block and, immediately following the four spatial neighboring candidates, an advanced temporal motion vector prediction (ATMVP) candidate, code an index into the merge candidate list that identifies a merge candidate of the plurality of merge candidates in the merge candidate list, and code the current block of video data using motion information of the identified merge candidate.

The details of one or more examples are set forth in the accompanying drawings and the description below. Other features, objects, and advantages will be apparent from the description and drawings, and from the claims.

DETAILED DESCRIPTION

Figure 1:
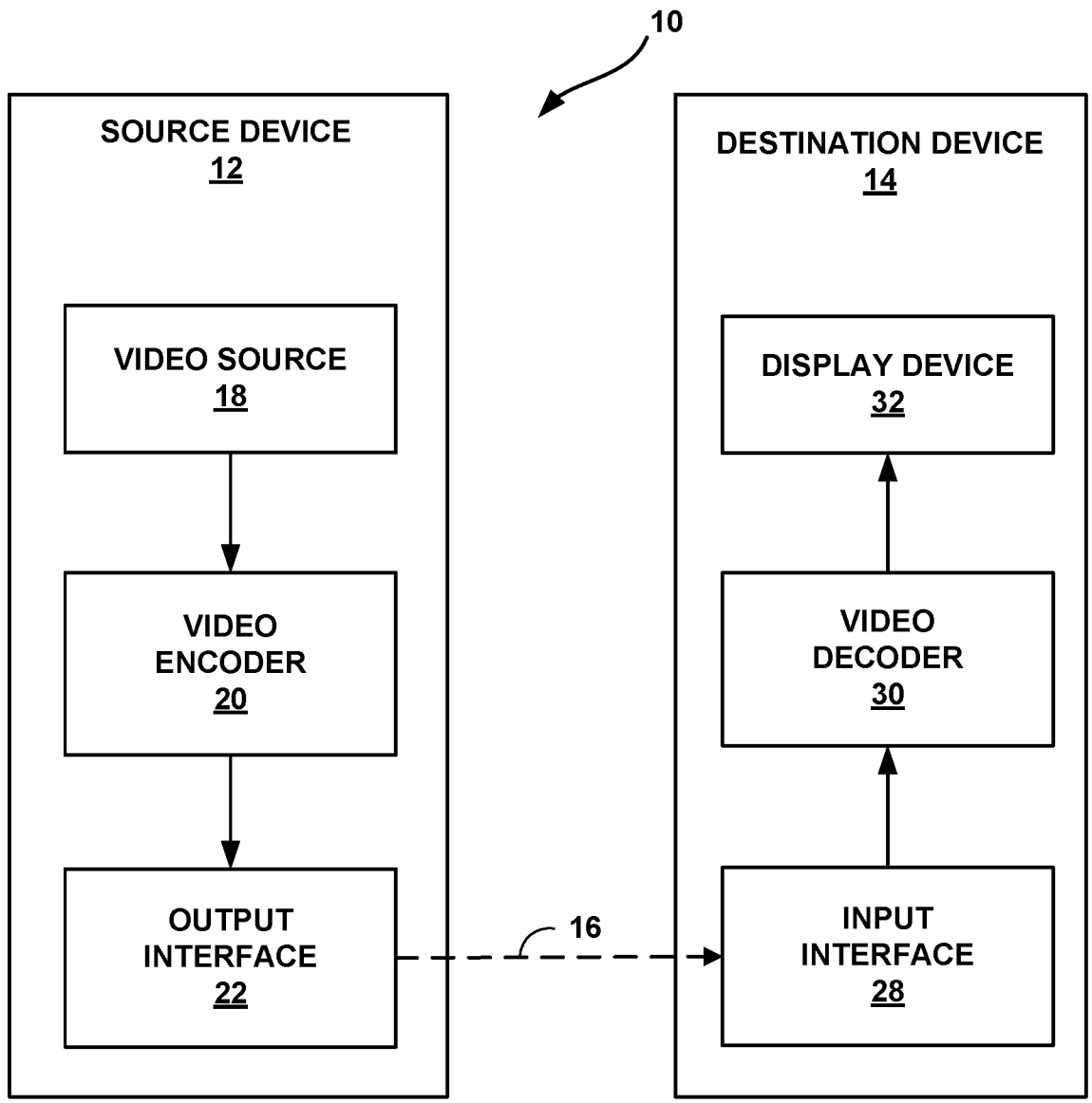
FIG. 1 is a block diagram illustrating an example video encoding and decoding system that may utilize techniques for implementing advanced temporal motion vector prediction (ATMVP).

In general, this disclosure is related to motion vector prediction in video codecs. More specifically, advanced temporal motion vector prediction is achieved by collecting the motion vectors in a sub-block (sub-PU) level for a given block (prediction unit).

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. One joint draft of MVC is described in "Advanced video coding for generic audiovisual services," ITU-T Recommendation H.264, March, 2010.

In addition, there is a newly developed video coding standard, namely High Efficiency Video Coding (HEVC), developed by the Joint Collaboration Team on Video Coding (JCT-VC) of ITU-T Video Coding Experts Group (VCEG) and ISO/IEC Motion Picture Experts Group (MPEG). A recent draft of HEVC is available from http://phenix.int-evey.fr/jct/doc_end_user/documents/12_Geneva/wg11/JCTVC-L1003-v34.zip. The HEVC standard is also presented jointly in Recommendation ITU-T H.265 and International Standard ISO/IEC 23008-2, both entitled "High efficiency video coding," and both published October, 2014.

Motion information: For each block, a set of motion information can be available. A set of motion information contains motion information for forward and backward prediction directions. Here, forward and backward prediction directions are two prediction directions of a bi-directional prediction mode and the terms "forward" and "backward" do not necessarily have a geometry meaning; instead they correspond to reference picture list 0 (RefPicList0) and reference picture list 1 (RefPicList1) of a current picture. When only one reference picture list is available for a picture or slice, only RefPicList0 is available and the motion information of each block of a slice is always forward.

For each prediction direction, the motion information must contain a reference index and a motion vector. In some cases, for simplicity, a motion vector itself may be referred to in a way that it is assumed that it has an associated reference index. A reference index is used to identify a reference picture in the current reference picture list (RefPicList0 or RefPicList1). A motion vector has a horizontal and a vertical component.

Picture order count (POC) is widely used in video coding standards to identify a display order of a picture. Although there are cases in which two pictures within one coded video sequence may have the same POC value, it typically does not happen within a coded video sequence. When multiple coded video sequences are present in a bitstream, pictures with a same value of POC may be closer to each other in terms of decoding order. POC values of pictures are typically used for reference picture list construction, derivation of reference picture sets as in HEVC and motion vector scaling. Macroblock (MB) structure in Advanced Video Coding (AVC) (H.264): In H.264/AVC, each inter macroblock (MB) may be partitioned into four different ways:

One 16×16 MB partition
Two 16×8 MB partitions
Two 8×16 MB partitions
Four 8×8 MB partitions Different MB partitions in one MB may have different reference index values for each direction (RefPicList0 or RefPicList1).

When an MB is not partitioned into four 8×8 MB partitions, it has only one motion vector for each MB partition in each direction.

When an MB is partitioned into four 8×8 MB partitions, each 8×8 MB partition can be further partitioned into sub-blocks, each of which can have a different motion vector in each direction. There are four different ways to get sub-blocks from an 8×8 MB partition:

One 8×8 sub-block
Two 8×4 sub-blocks
Two 4×8 sub-blocks
Four 4×4 sub-blocks

Each sub-block can have a different motion vector in each direction. Therefore, a motion vector is present in a level equal to higher than sub-block.

Temporal direct mode in AVC: In AVC, temporal direct mode could be enabled in either MB or MB partition level for skip or direct mode in B slices. For each MB partition, the motion vectors of the block co-located with the current MB partition in the RefPicList1[0] of the current block are used to derive the motion vectors. Each motion vector in the co-located block is scaled based on POC distances.

Spatial direct mode in AVC: In AVC, a direct mode can also predict motion information from the spatial neighbors.

Coding Unit (CU) Structure in High Efficiency Video Coding (HEVC): In HEVC, the largest coding unit in a slice is called a coding tree block (CTB) or coding tree unit (CTU). A CTB contains a quad-tree the nodes of which are coding units.

The size of a CTB can be ranges from 16×16 to 64×64 in the HEVC main profile (although technically 8×8 CTB sizes can be supported). A coding unit (CU) could be the same size of a CTB although and as small as 8×8. Each coding unit is coded with one mode. When a CU is inter coded, it may be further partitioned into 2 or 4 prediction units (PUs) or become just one PU when further partition doesn't apply. When two PUs are present in one CU, they can be half size rectangles or two rectangle size with ¼ or ¾ size of the CU.

When the CU is inter coded, one set of motion information is present for each PU. In addition, each PU is coded with a unique inter-prediction mode to derive the set of motion information.

Motion prediction in HEVC: In HEVC standard, there are two inter prediction modes, named merge (skip is considered as a special case of merge) and advanced motion vector prediction (AMVP) modes respectively for a prediction unit (PU).

In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

As can be seen above, a merge candidate corresponds to a full set of motion information while an AMVP candidate contains just one motion vector for a specific prediction direction and reference index.

The candidates for both modes are derived similarly from the same spatial and temporal neighboring blocks.

The sub-PU design for a 2D video codec, especially the one related to the advanced TMVP, may encounter the following problems. A sub-PU based temporal motion vector prediction process can be achieved by defining such a process as an additional candidate, namely ATMVP candidate. However, there are the following design issues for such an ATMVP candidate:
1. Although an ATMVP candidate may be inserted as an additional candidate as TMVP, the position of such an ATMVP candidate, as well as the interaction with the TMVP candidate to achieve higher coding efficiency is not known.
2. It is not clear how to define the availability of the ATMVP candidate; it would be of high complexity if all motion vectors of all sub-PUs were to be checked to determine whether an ATMVP candidate is unavailable and thus can be inserted into the ATMVP candidate.
3. The pruning process with an ATMVP candidate may be needed; however pruning with such a candidate may be complicated.
4. Various other design details for ATMVP candidate to achieve the best trade-off between coding efficiency and complexity remain unknown.

FIG. 1 is a block diagram illustrating an example video encoding and decoding system 10 that may utilize techniques for implementing advanced temporal motion vector prediction (ATMVP). As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for advanced temporal motion vector prediction (ATMVP). In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for advanced temporal motion vector prediction (ATMVP) may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard, extensions to the HEVC standard, or subsequent standards, such as ITU-T H.266. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HEVC HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Figure 9:
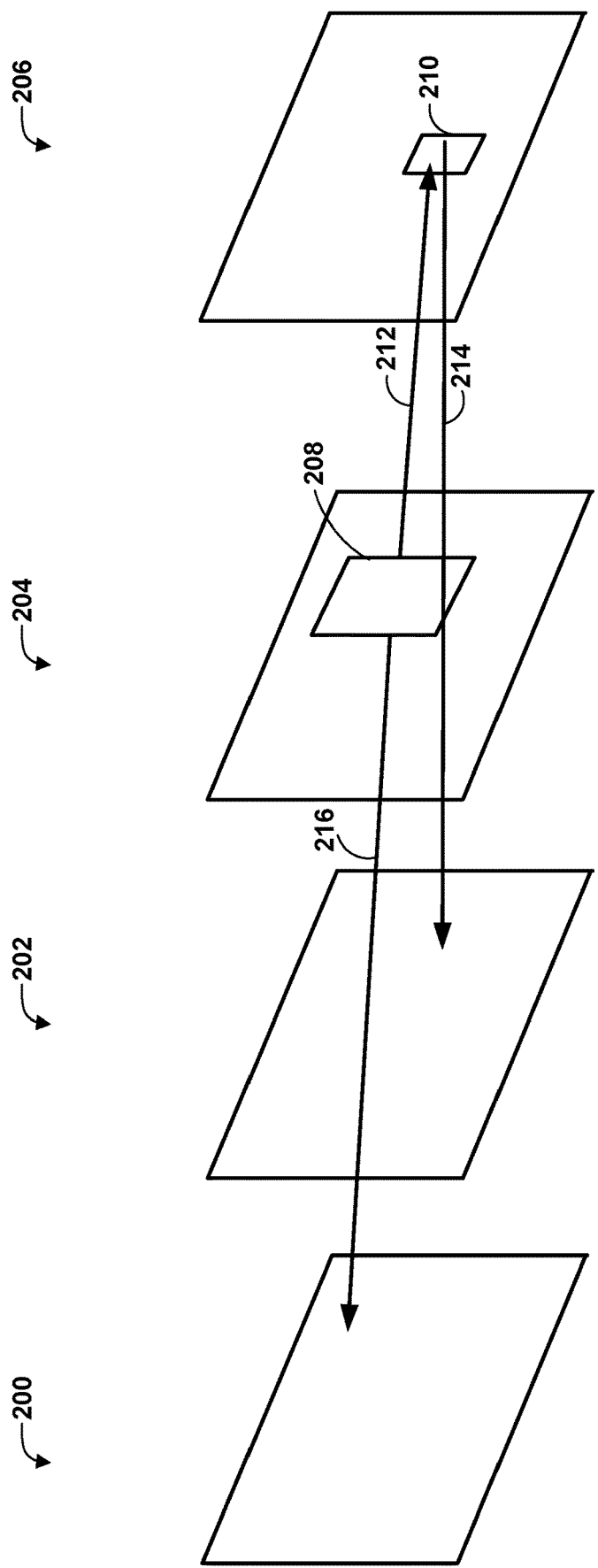
FIG. 9 is a conceptual diagram illustrating relevant pictures in ATMVP (similar to TMVP).

In accordance with the techniques of this disclosure, video encoder 20 and video decoder 30 may be configured to perform any or all of the following techniques shown in the enumerated list below, alone or in any combination:

1. Position of the ATMVP candidate, if inserted, e.g., as a merge candidate list
   a. Assume the spatial candidates and TMVP candidate are inserted into a merge candidate list in a certain order. The ATMVP candidate may be inserted in any relatively fixed position of those candidates.
      i. In one alternative, for example, the ATMVP candidate can be inserted in the merge candidate list after the first two spatial candidates e.g., A1 and B1;
      ii. In one alternative, for example, the ATMVP candidate can be inserted after the first three spatial candidates e.g., A1 and B1 and B0;
      iii. In one alternative, for example, the ATMVP candidate can be inserted after the first four candidates e.g., A1, B1, B0, and A0.
      iv. In one alternative, for example, the ATMVP candidate can be inserted right before the TMVP candidate.
      v. In one alternatively, for example, the ATMVP candidate can be inserted right after the TMVP candidate.
   b. Alternatively, the position of ATMVP candidate in the candidate list can be signaled in the bitstream. The positions of other candidates, including the TMVP candidate can be additionally signaled.
2. Availability check of the ATMVP candidate can apply by accessing just one set of motion information. When such set of information is unavailable, e.g., one block being intra-coded, the whole ATMVP candidate is considered as unavailable. In that case, the ATMVP will not be inserted into the merge list.
   a. A center position, or a center sub-PU is used purely to check the availability of the ATMVP candidate. When a center sub-PU is used, the center sub-PU is chosen to be the one that covers the center position (e.g., the center 3 position, with a relative coordinate of (W/2, H/2) to the top-left sample of the PU, wherein W×H is the size of the PU). Such a position or center sub-PU may be used together with the temporal vector to identify a corresponding block in the motion source picture. A set of motion information from the block that covers the center position of a corresponding block is identified.
3. Representative set of motion information for the ATMVP coded PU from a sub-PU.
   a. To form the ATMVP candidate the representative set of motion information is first formed.
   b. Such a representative set of motion information may be derived from a fixed position or fixed sub-PU. It can be chosen in the same way as that of the set of motion information used to determine the availability of the ATMVP candidate, as described in bullet #2.
   c. When a sub-PU has identified its own set of motion information and is unavailable, it is set to be equal to the representative set of motion information.
   d. If the representative set of motion information is set to be that of a sub-PU, no additional motion storage is needed at the decoder side for the current CTU or slice in the worst case scenario.
   e. Such a representative set of motion information is used in all scenarios when the decoding processes requires the whole PU to be represented by one set of motion information, including pruning, such that the process is used to generate combined bi-predictive merging candidates.
4. The ATMVP candidate is pruned with TMVP candidate and interactions between TMVP and ATMVP can be considered; detailed techniques are listed below:
   a. The pruning of a sub-PU based candidate, e.g., ATMVP candidate with a normal candidate, may be conducted by using the representative set of motion information (as in bullet #3) for such a sub-PU based candidate. If such set of motion information is the same as a normal merge candidate, the two candidates are considered as the same.
   b. Alternatively, in addition, a check is performed to determine whether the ATMVP contains multiple different sets of motion information for multiple sub-Pus; if at least two different sets are identified, the sub-PU based candidate is not used for pruning, i.e., is considered to be different to any other candidate; Otherwise, it may be used for pruning (e.g., may be pruned during the pruning process).
   c. Alternatively, in addition, the ATMVP candidate may be pruned with the spatial candidates, e.g., the left and top ones only, with positions denoted as A1 and B1.
   d. Alternatively, only one candidate is formed from temporal reference, being either ATMVP candidate or TMVP candidate. When ATMVP is available, the candidate is ATMVP; otherwise, the candidate is TMVP. Such a candidate is inserted into the merge candidate list in a position similar to the position of TMVP. In this case, the maximum number of candidates may be kept as unchanged.
      i. Alternatively, TMVP is always disabled even when ATMVP is unavailable.
      ii. Alternatively, TMVP is used only when ATMVP is unavailable.
   e. Alternatively, when ATMVP is available and TMVP is unavailable, one set of motion information of one sub-PU is used as the TMVP candidate. In this case, furthermore, the pruning process between ATMVP and TMVP is not applied.
   f. Alternatively, or additionally, the temporal vector used for ATMVP may be also used for TMVP, such that the bottom-right position or center 3 position as used for current TMVP in HEVC do not need to be used.
      i. Alternatively, the position identified by the temporal vector and the bottom-right and center 3 positions are jointly considered to provide an available TMVP candidate.
5. Multiple availability checks for ATMVP are supported to give higher chances for the ATMVP candidate to be more accurate and efficient. When the current ATMVP candidate from the motion source picture as identified by the first temporal vector (e.g., as shown in FIG. 9) is unavailable, other pictures can be considered as motion source picture. When another picture is considered, it may be associated with a different second temporal vector, or may be associated simply with a second temporal vector scaled from the first temporal vector that points to the unavailable ATMVP candidate.
   a. A second temporal vector can identify an ATMVP candidate in a second motion source picture and the same availability check can apply. If the ATMVP candidate as derived from the second motion source picture is available, the ATMVP candidate is derived and no other pictures need to be checked; otherwise, other pictures as motion source pictures need to be checked.
   b. Pictures to be checked may be those in the reference picture lists of the current picture, with a given order. For each list, the pictures are checked in the ascending order of the reference index. List X is first checked and pictures in list Y (being 1-X) follows.
      i. List X is chosen so that list X is the list that contains the co-located picture used for TMVP.
      ii. Alternatively, X is simply set to be 1 or 0.
   c. Pictures to be checked are those identified by motion vectors of the spatial neighbors, with a given order.
6. A partition of the PU that the current ATMVP apply to may be 2N×2N, N×N, 2N×N, N×2N or asymmetric motion partition (AMP) partitions, such as 2N×N/2.
   a. Alternatively, in addition, if other partition sizes can be allowed, ATMVP can be supported too, and such a size may include e.g., 64×8.
   b. Alternatively, the mode may be only applied to certain partitions, e.g., 2N×2N.
7. The ATMVP candidate is marked as a different type of merge candidate.
8. When identifying a vector (temporal vector as in the first stage) from neighbors, multiple neighboring positions, e.g., those used in merge candidate list construction, can be checked in order. For each of the neighbors, the motion vectors corresponding to reference picture list 0 (list 0) or reference picture list 1 (list 1) can be checked in order. When two motion vectors are available, the motion vectors in list X can be checked first and followed by list Y (with Y being equal to 1-X), so that list X is the list that contains the co-located picture used for TMVP. In ATMVP, a temporal vector is used be added as a shift of any center position of a sub-PU, wherein the components of temporal vector may need to be shifted to integer numbers. Such a shifted center position is used to identify a smallest unit that motion vectors can be allocated to, e.g., with a size of 4×4 that covers the current center position.
   a. Alternatively, motion vectors corresponding to list 0 may be checked before those corresponding to list 1;
   b. Alternatively, motion vectors corresponding to list 1 may be checked before those corresponding to list 0;

c. Alternatively, all motion vectors corresponding to list X in all spatial neighbors are checked in order, followed by the motion vectors corresponding to list Y (with Y being equal to 1-X). Here, list "X" can be the list that indicates where co-located picture belongs, or just simply set to be 0 or 1.

d. The order of the spatial neighbors can be the same as that used in HEVC merge mode.

9. When in the first stage of identifying a temporal vector does not include information identifying a reference picture, the motion source picture as shown in FIG. 9, may be simply set to be a fixed picture, e.g., the co-located picture used for TMVP.

a. In such a case, the vector may only be identified from the motion vectors that point to such a fixed picture.

b. In such a case, the vector may only be identified from the motion vectors that point to any picture but further scaled towards the fixed picture.

10. When in the first stage of identifying a vector consists identifying a reference picture, the motion source picture as shown in FIG. 9, one or more of the following additional checks may apply for a candidate motion vector.

a. If the motion vector is associated with a picture or slice that is Intra coded, such a motion vector is considered as unavailable and cannot be used to be converted to the vector.

b. If the motion vector identifies an Intra block (by e.g., adding the current center coordinate with the motion vector) in the associated picture, such a motion vector is considered as unavailable and cannot be used to be converted to the vector.

11. When in the first stage of identifying a vector, the components of the vector may be set to be (half width of the current PU, half height of the current PU), so that it identifies a bottom-right pixel position in the motion source picture. Here (x, y) indicates a horizontal and vertical components of one motion vector.

a. Alternatively, the components of the vector may be set to be (sum(half width of the current PU, M), sum(half height of the current PU, N)) where the function sum(a, b) returns the sum of a and b. In one example, when the motion information is stored in 4×4 unit, M and N are both set to be equal to 2. In another example, when the motion information is stored in 8×8 unit, M and N are both set to be equal to 4.

12. The sub-block/sub-PU size when ATMVP applies is signaled in a parameter set, e.g., sequence parameter set of picture parameter set. The size ranges from the least PU size to the CTU size. The size can be also pre-defined or signaled. The size can be, e.g., as small as 4×4. Alternatively, the sub-block/sub-PU size can be derived based on the size of PU or CU. For example, the sub-block/sub-PU can be set equal to max (4×4, (width of CU)>>M). The value of M can be pre-defined or signaled in the bitstream.

13. The maximum number of merge candidates may be increased by 1 due to the fact that ATMVP can be considered as a new merge candidate. For example, compared to HEVC which takes up to 5 candidates in a merge candidate list after pruning, the maximum number of merge candidates can be increased to 6.

a. Alternatively, pruning with conventional TMVP candidate or unification with the conventional TMVP candidate can be performed for ATMVP such that the maximum number of merge candidates can be kept as unchanged.

b. Alternatively, when ATMVP is identified to be available, a spatial neighboring candidate is excluded from the merge candidate list, e.g. the last spatial neighboring candidate in fetching order is excluded.

14. When multiple spatial neighboring motion vectors are considered to derive the temporal vector, a motion vector similarity may be calculated based on the neighboring motion vectors of the current PU as well as the neighboring motion vectors identified by a specific temporal vector being set equal to a motion vector. The one that leads to the highest motion similarity may be chosen as the final temporal vector.

a. In one alternative, for each motion vector from a neighboring position N, the motion vector identifies a block (same size as the current PU) in the motion source picture, wherein its neighboring position N contains a set of the motion information. This set of motion vector is compared with the set of motion information as in the neighboring position N of the current block.

b. In another alternative, for each motion vector from a neighboring position N, the motion vector identifies a block in the motion source picture, wherein its neighboring positions contain multiple sets of motion information. These multiple sets of motion vector are compared with the multiple sets of motion information from the neighboring positions of the current PU in the same relative positions. A motion information similarity is calculated. For example, the current PU has the following sets of motion information from A1, B1, A0 and B0, denoted as MIA1, MIB1, MIA0 and MIB0. For a temporal vector TV, it identifies a block corresponding to the PU in the motion source picture. Such a block has motion information from the same relative A1, B1, A0 and B0 positions, and denoted as TMIA1, TMIB1, TMIA0 and TMIB0. The motion similarity as determined by TV is calculated as $MStv=\Sigma_{(N\in\{A1,B1,A0,B0\})}$ ⦃MVSim(⟦MI⟧_N, ⟦TMI⟧_N)⦄, wherein MVSim defines the similarity between two sets of motion information.

c. In both of the above cases, the motion similarity MVSim can be used, wherein the two input parameters are the two sets of motion information, each containing up to two motion vectors and two reference indices. Each pair of the motion vectors in list X are actually associated with reference pictures in different list X of different pictures, the current picture and the motion source picture. For each of the two motion vectors MVXN and TMVXN (with X being equal to 0 or 1), the motion vector difference MVDXN can be calculated as MVXN−TMVXN. Afterwards, the difference MVSimX is calculated as e.g., abs(⟦MVDX⟧_N [0])+abs(⟦MVDX⟧_N [1]), or (⟦MVSX⟧_N [0]*⟦MVDX⟧_N [0]+⟦MVDX⟧_N [1]*⟦MVDX⟧_N [1]). If both sets of motion information contain available motion vectors, MVSim is set equal to MVSim0+MVSim1.

i. In order to have a unified calculation of the motion difference, both of the motion vectors need to be scaled towards the same fixed picture, which can be, e.g., the first reference picture RefPicListX[0] of the list X of the current picture.

ii. If the availability of the motion vector in list X from the first set and the availability of the motion vector in list X from the second set are different, i.e., one reference index is −1 while the other is not, such two sets of motion information are considered as not similar in direction X. If the two sets are not similar in both sets, the final MVSim function may return a big value T, which may be, e.g., considered as infinite.

iii. Alternatively, for a pair of sets of motion information, if one is predicted from list X (X being equal to 0 or 1) but not list Y (Y being equal to 1-X) and the other has the same status, a weighting between 1 and 2 (e.g., MVSim is equal to MVSimX*1.5) may be used. When one set is only predicted from list X and the other is only predicted from list Y, MVSim is set to the big value T.

iv. Alternatively, for any set of motion information, as long as one motion vector is available, both motion vectors will be produced. In the case that only one motion vector is available (corresponding to list X), it is scaled to form the motion vector corresponding to the other list Y.

d. Alternatively, the motion vector may be measured based on differences between the neighboring pixels of the current PU and the neighboring pixels of the block (same size as the current PU) identified by the motion vector. The motion vector that leads to the smallest difference may be chosen as the final temporal vector.

15. When deriving the temporal vector of the current block, motion vectors and/or temporal vectors from neighboring blocks that are coded with ATMVP may have a higher priority than motion vectors from other neighboring blocks.

a. In one example, only temporal vectors of neighboring blocks are checked first, and the first available one can be set to the temporal vector of the current block. Only when such temporal vectors are not present, normal motion vectors are further checked. In this case, temporal vectors for ATMVP coded blocks need to be stored.

b. In another example, only motion vectors from ATMVP coded neighboring blocks are checked first, and the first available one can be set to the temporal vector of the current block. Only when such temporal vectors are not present, normal motion vectors are further checked.

c. In another example, only motion vectors from ATMVP coded neighboring blocks are checked first, and the first available one can be set to the temporal vector of the current block. If such motion vectors are not available, the checking of temporal vector continues similar as in bullet 15*a*.

d. In another example, temporal vectors from neighboring blocks are checked first, the first available one can be set to the temporal vector of the current block. If such motion vectors are not available, the checking of temporal vector continues similar as in bullet 15*b*.

e. In another example, temporal vectors and motion vectors of ATMVP coded neighboring blocks are checked first, the first available one can be set to the temporal vector of the current block. Only when such temporal vectors and motion vectors are not present, normal motion vectors are further checked.

16. When multiple spatial neighboring motion vectors are considered to derive the temporal vector, a motion vector may be chosen so that it minimizes the distortion that is calculated from the pixel domain, e.g., template matching may be used to derive the temporal vector such that the one leads to minimal matching cost is selected as the final temporal vector.

17. Derivation of a set of motion information from a corresponding block (in the motion source picture) is done in a way that when a motion vector is available in the corresponding block for any list X (denote the motion vector to be MVX), for the current sub-PU of the ATMVP candidate, the motion vector is considered as available for list X (by scaling the MVX). If the motion vector is unavailable in the corresponding block for any list X, the motion vector is considered as unavailable for list X.

a. Alternatively, when motion vector in the corresponding block is unavailable for list X but available for list 1-X (denoted 1-X by Y and denote the motion vector to be MVY), the motion vector is still considered as available for list X (by scaling the MVY towards the target reference picture in list X).

b. Alternatively, or in addition, when both motion vectors in the corresponding block for list X and list Y (equal to 1-X) are available, the motion vectors from list X and list Y are not necessary used to directly scale and generate the two motion vectors of a current sub-PU by scaling.

i. In one example, when formulating the ATMVP candidate, the low-delay check as done in TMVP applies to each sub-PU. If for every picture (denoted by refPic) in every reference picture list of the current slice, picture order count (POC) value of refPic is smaller than POC of current slice, current slice is considered with low-delay mode. In this low-delay mode, motion vectors from list X and list Y are scaled to generate the motion vectors of a current sub-PU for list X and list Y, respectively. When not in the low-delay mode, only one motion vector MVZ from MVX or MVY is chosen and scaled to generate the two motion vectors for a current sub-PU. Similar to TMVP, in such a case Z is set equal to collocated_from_l0_flag, meaning that it depends on whether the co-located picture as in TMVP is in the list X or list Y of the current picture. Alternatively, Z is set as follows: if the motion source picture is identified from list X, Z is set to X. Alternatively, in addition, when the motion source pictures belong to both reference picture lists, and RefPicList0[idx0] is the motion source picture that is first present in list 0 and RefPicList(1)[idx1] is the motion source picture that is first present in list 1, Z is set to be 0 if idx0 is smaller than or equal to idx1, and set to be 1 otherwise.

18. The motion source picture may be signaled, e.g., generated by video encoder 20 in a coded bitstream. In detail, a flag indicating whether the motion source picture is from list 0 or list 1 is signaled for a B slice. Alternatively, in addition, a reference index to a list 0 or list 1 of the current picture may be signaled to identify the motion source picture.

19. When identifying a temporal vector, a vector is considered as unavailable (thus other ones can be considered) if it points to an Intra coded block in the associated motion source picture.

Implementation of the various techniques of this disclosure is discussed below. It is assumed that the ATMVP is implemented on top of HEVC version 1. Motion compression may not apply to reference pictures and smaller blocks with bi-directional motion compensation may be enabled.

Signaling of ATMVP in SPS:

atmvp_sub_pu_size may be present in SPS.

atmvp_sub_pu_size may specify the size of the sub-PUs of a PU coded with ATMVP mode. It is in the range of 2 to 6, inclusive. The sub-PU size for ATMVP, (spuWidth, spuHeight) is derived as min (w, 1<<atmvp_sub_pu_size) by min(h, 1<<atmvp_sub_pu_size), wherein w×h is the size of a current PU.

Alternatively, both width and height of the sub-PU sizes are signaled separately in SPS.

Alternatively, the sub-PU sizes are signaled in contrast to the CTU size or the smallest coding unit size.

A variable atmvpEnableFlag is derived to be equal to 1 if atmvp_sub_pu_size is smaller than a CTU size (e.g., 6 as in HEVC version 1), and 0, otherwise.

Signaling of ATMVP in slice header: five_minus_num_merge_cand specifies the maximum number of merging MVP candidates supported in the slice subtracted from 5. The maximum number of merging MVP candidates, MaxNumMergeCand is derived as:

MaxNumMergeCand=(atmvpEnableFlag? 6:5)−five_minus_max_num_merge_cand     (7-41)

The value of five_minus_max_num_merge_cand shall be limited such that MaxNumMergeCand is in the range of 1 to (atmvpEnableFlag? 6:5), inclusive.

Alternatively, the five_minus_max_num_merge_cand is changed to six_minus_max_num_merge_cand and the semantics are as follows:

six_minus_max_num_merge_cand specifies the maximum number of merging MVP candidates supported in the slice subtracted from 6. The maximum number of merging MVP candidates, MaxNumMergeCand is derived as MaxNumMergeCand=6−six_minus_max_num_merge_cand     (7-41)

Alternatively, max_num_merge_cand_minus1 is directly signaled.

In some examples, other syntax changes are unnecessary, and an ATMVP candidate is identified by a merge_idx, which may be in the range of 0 to 5, inclusive.

Decoding processes related to ATMVP: The following decoding processes may be implemented, e.g., by video decoder 30, to formulate an ATMVP candidate and include it as part of the merge candidate list:

Identification of the first stage temporal vector:

Set variable mtSrcPOC to the POC value of the co-located picture used in TMVP, tV to a zero vector, and atmvpAvaFlag is set to 0.

For each of the position N of spatial neighboring positions, being A1, B1, B0, A0, and B2, the following apply:

dir is set equal to collocated_from_l0_flag;

For X being equal to dir through (1-dir), inclusive, if the current slice is a B slice, or just X being equal to 0 if the current slice is not a B slice, the following apply:

When the neighboring block N is available and it is not Intra coded, and RefIdxX[N] is larger than or equal to 0 (denote MVLX[N] and RefIdxX[N] are the motion vector and reference index of the neighboring block N corresponding to RefPicListX), the following steps apply in order:

mtSrcPOC is set equal to the POC value of the RefPicListX[RefIdxX[N]];

tV is set equal to MVLX[N];

atmvpAvaFlag is set to 1;

terminate this process.

Identification of an available motion source:

Set a list of pictures to be CanPicATMVP to be an empty list.

CanPicATMVP[0] is set to be the picture with POC value equal to mtSrcPOC.

i is set equal to 1;

MotionSrcPic is an empty picture and can be updated as specified below.

For each of the available reference picture list X, the following apply:

dir is set equal to collocated_from_l0_flag;

For X being equal to dir through (1-dir), inclusive, if the current slice is a B slice, or just X being equal to 0 if the current slice is not a B slice, the following apply:

For each idx from 0 through num_ref_active_lX_minus1;

CanPicATMVP[i++]=RefPicListX[idx];

Let (CurrPosX, CurrPosY) be the coordinate of the top-left pixel position of the current PU.

For n being equal to 0 through i, inclusive, the following apply.

If n is not equal to 0, scale the tV towards the picture CanPicATMVP[n] to derive a tScaledVector, wherein the relevant pictures for the tV are the current picture and the CanPicATMVP[0], and the relevant pictures for the destination vector tScaledVector are the current picture and the CanPicATMVP[i];

Otherwise (n is equal to 0), tScaledVector is set equal to tV.

Get the motion information of the block corresponding to the center sub-PU from the CanPicATMVP[n] as follows:

centerPosX=CurrPosX+=((tScaledVector[0]+2)>>2);

centerPosY=CurrPosY+=((tScaledVector[1]+2)>>2);

Let (centerPosX, centerPosY) be the position that identifies the corresponding block of the center sub-PU and the current PU size to be width by height.

centerPosX+=CurrPosX+((width/spuWidth)>>1)
*spuWidth+(min(spuWidth, width)>>1);

centerPosY+=CurrPosX+((height/spuHeight)>>1)
*spuHeight+(min(spuHeight, height)>>1);

Invoke the motion information fetching process that grabs the motion information, with a picture mtnSrcPic being equal to CanPicATMVP[n], and a position (posX, posY) being equal to (centerPosX, centerPosY) as input and a sub-PU motion available flag SubPuMtnAvaFlag, a pair of reference indices sColRefIdx0 and sColRefIdx1, and a pair of motion vectors, sColMV0, sColMV1 as output.

If SubPuMtnAvaFlag is equal to 1, the following applies.

MotionSrcPic is set to CanPicATMVP[n]

tV is set to be tScaledVector terminate this loop.

Motion information fetching process:

The input of this process are a picture mtnSrcPic and a position (posX, posY) with the picture, and the output of this process are the motion available flag mtnAvaFlag, a pair of refence indices refIdx0 and refIdx1, and a pair of motion vectors, mv0, mv1.

The (posX, posY) is firstly clipped to be within the picture mtnSrcPic.

The 4×4 (or other smallest size that storing motion information) block blkT, containing the position (posX, posY) is identified.

mtnAvaFlag is set equal to 0.

If blkT is not Intra coded, and its motion information contains blkTRefIdx0, blkTRefIdx1, blkTMv0, and blkTMv1, the following applies.

When either blkTRefIdx0 or blkTRefIdx1 is larger than or equal to 0, mtnAvaFlag is set equal to 1 and the following applies for X being equal to 0 and 1.

refIdxX is set equal to the blkTRefIdxX mvX is set equal to the blkTMvX

Generation of sub-PU motion for ATMVP:

If SubPuMtnAvaFlag is equal to 1, the following process is invoked.

For each of the sub-PU (e.g., in raster-scan order), the following applies.

Denote the horizontal index and vertical index of the current sub-PU as k and l respectively, wherein k ranges from 0 through width/spuWidth-1, inclusive and l ranges from 0 through height/spuHeight-1, inclusive. For example, if an 16×16 PU is divided into four 8×8 sub-PUs, the (k, l) values of the four sub-PUs in raster scan order are (0, 0), (1, 0), (0, 1) and (1, 1) respectively.

Sub-PU's coordinate (tempPosX, tempPosY) are caculated as (tempPosX, tempPosY)=(CurrPosX, CurrPosY)+(k*spuWidth, l*spuHeight).

tempPosX+=((tV[0]+2)>>2);

tempPosY+=((tV[1]+2)>>2);

Invoke the motion information fetching process that grabs the motion information, with a picture mtnSrcPic being equal to MotionSrcPic, and a position (posX, posY) being equal to (tempPosX, tempPosY) as input and a sub-PU motion available flag currSubPuMtnAvaFlag, a pair of refence indices currSubRefIdx0 and currSubRefIdx1, and a pair of motion vectors, currSubMV0, currSubMV1 as output.

When currSubPuMtnAvaFlag is equal to 0, for X equal to 0 and 1, inclusive, currSubReflxIdxX is set equal to cColRefIdxX and currSubMVX is set equal to cColMVX.

For X being equal to 0 and 1, inclusive, scale the motion vector currSubMVX, towards the default target reference picture of the current picture, which is RefPicListX[0], similar as in MVP. Denote the derived reference index and motion vector for the current sub-PU as cSpuRefIdxX and cSpuMVX and they are derived as follows:

cSpuRefIdxX=(currSubRefIdxX>=0 ? 0: −1);

cSpuMVX is set to be the scaled vector of currSubMVX, similar as in TMVP.

The representative set of motion information, aRefIdxX, and aMVX (for X being equal to 0 or 1) for this ATMVP candidate is derived as follows:

aRefIdxX=(cColRefIdxX>=0 ? 0: −1);

aMVX is set to be the scaled vector of cColMVX, similar as in TMVP.

Alternatively, the motion fetching process and motion scaling process are the same (or similar) as in TMVP of HEVC version 1, i.e., the subclause 8.5.3.2.8 of HEVC version 1: "Derivation process for collocated motion vectors" applies to replace the highlighted text in this sub-section. In this case, the motion fetching and motion scaling process as in TMVP (subclause 8.5.3.2.8) replace the motion fetching process and motion scaling process defined above (including as indicated by italicized text).

Insertion of ATMVP candidate in a merge candidate list:

When SubPuMtnAvaFlag is equal to 1, the ATMVP candidate is inserted into the merge candidate after the A0 (or alternatively B0) candidate is tested and possibly inserted into the merge candidate list.

The motion information for this candidate is considered to be formed by aRefIdxX, and aMVX (with X being equal to 0 or 1).

When TMVP candidate is available, it is further compared with the representative information of the ATMVP candidate (aRefIdxX, and aMVX); only if the TMVP candidate has a refIdxX being unequal to aRefIdxX or motion vector being unequal to aMVX (with X being equal to 0 or 1), it is further inserted into the merge candidate list.

When all the candidates, including the ATMVP candidate are considered transparently as represented by one single set of motion information (up to two reference indices and two associated motion vectors), the representative information for the ATMVP candidate is used. For example, in the Derivation process for combined bi-predictive merging candidates, the representative motion information of the ATMVP is used.

In addition, each merge candidate is attached with a tag (can be a flag or a type) indicating whether such a candidate is an ATMVP candidate.

In addition, for an ATMVP candidate, the motion information sets, denoted above as cSpuRefIdxX and cSpuMVX for X being equal to 0 and 1 and for each sub-PU need to be stored for the current PU is decoded.

Motion compensation based on the ATMVP candidate:

When a current PU is coded with merge mode and the merge_idx specified a candidate indicated as an ATMVP candidate, for each sub-PU, the motion information cSpuRefIdxX and cSpuMVX (for X being equal to 0 and 1) are derived and used to perform motion compensation for the current sub-PU. After the motion compensation is done, the residual decoding and other processes are done in the same way as other inter modes.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
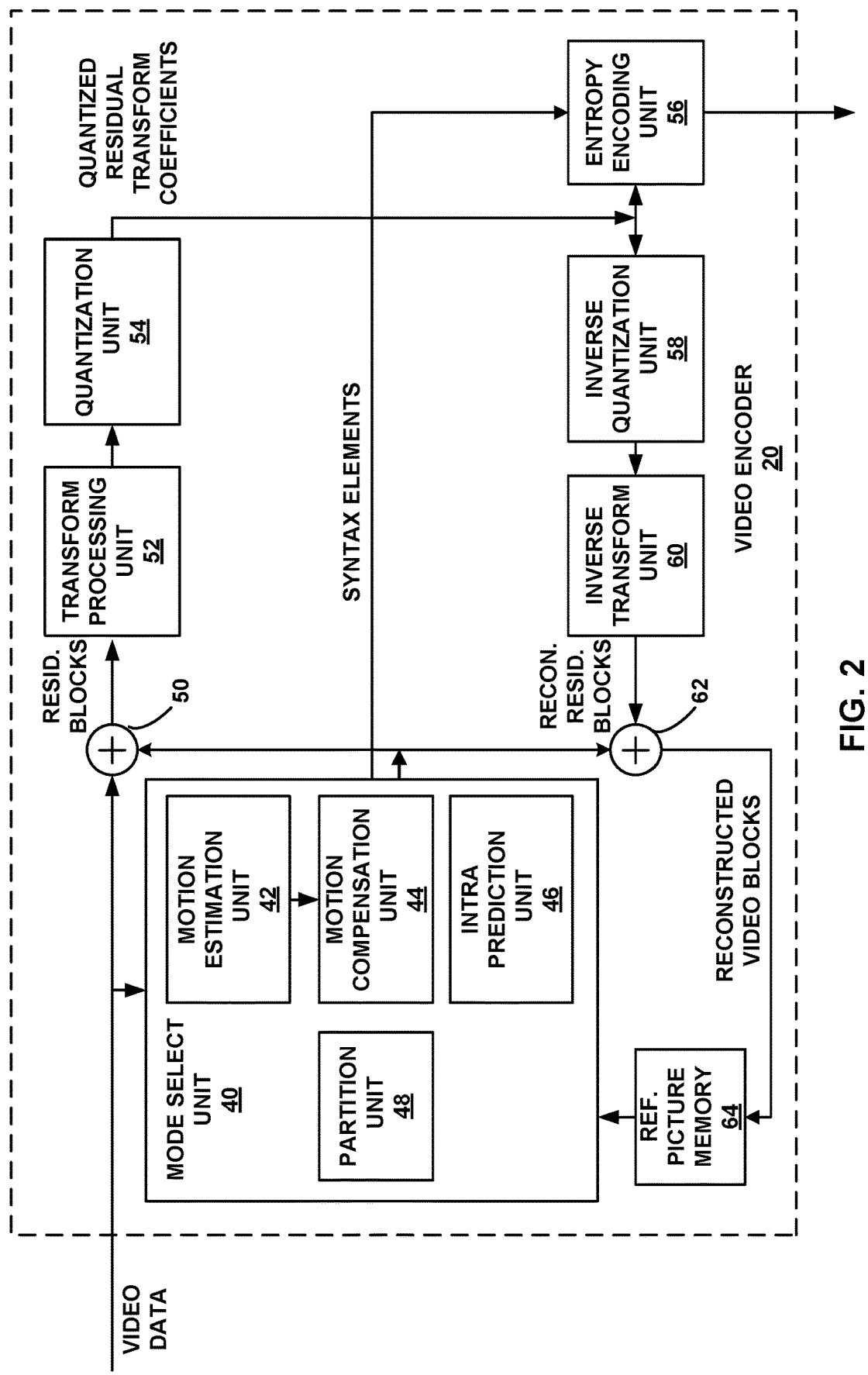
FIG. 2 is a block diagram illustrating an example of video encoder that may implement techniques for advanced temporal motion vector prediction (ATMVP).

FIG. 2 is a block diagram illustrating an example of video encoder 20 that may implement techniques for advanced temporal motion vector prediction (ATMVP). Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Video encoder 20 may be configured to perform any of the various techniques of this disclosure discussed above with respect to FIG. 1. For example, motion compensation unit 44 may be configured to code motion information for a block of video data using AMVP or merge mode in accordance with the techniques of this disclosure.

Assuming that motion compensation unit 44 elects to perform merge mode, motion compensation unit 44 may form a candidate list including a set of merge candidates. Motion compensation unit 44 may add candidates to the candidate list based on a particular, predetermined order. In one example, motion compensation unit 44 adds the candidates to the candidate list in the order of A1, B1, B0, A0, then an advanced temporal motion vector prediction (ATMVP) candidate. Motion compensation unit 44 may also add additional candidates and perform pruning of the candidate list, as discussed above. Ultimately, mode select unit 40 may determine which of the candidates is to be used to encode motion information of the current block, and encode a merge index representing the selected candidate.

Furthermore, in some examples, motion compensation unit 44 may first determine whether the ATMVP candidate is available. For example, motion compensation unit may determine a corresponding block to the current block in a reference picture and determine whether motion information is available for the corresponding block. Motion compensation unit 44 may then determine that the ATMVP candidate (that is, the corresponding block) is available when motion information is available for the corresponding block. In some examples, motion compensation unit 44 may determine that motion information is available for the corresponding block when the entire corresponding block (e.g., a center position block, as shown in FIG. 5a below) is predicted without the use of intra-prediction, but is not available when at least part of the corresponding block is predicted using intra-prediction.

Similarly, in some examples, motion compensation unit 44 may determine which of two potential ATMVP candidates should be used as the ATMVP candidate ultimately added to the candidate list. For example, motion compensation unit 44 may form a first temporal motion vector relative to the current block that identifies a first ATMVP candidate in a first motion source picture, that is, a first reference picture. If motion information is not available for the first ATMVP candidate, motion compensation unit 44 may determine whether motion information is available for a second, different ATMVP candidate. The second ATMVP candidate may be identified using the same temporal motion vector referring to a second, different reference picture, a different temporal motion vector referring to the same (i.e. first) reference picture, or a different temporal motion vector referring to the second, different reference picture. The reference pictures to be checked, as discussed above, may be in ascending order of a reference indexes in a reference picture list. Likewise, if different temporal motion vectors are used, the temporal motion vectors may be selected in a predetermined order from temporal vectors of neighboring blocks to the current block.

Furthermore, motion compensation unit 44 may determine whether a motion vector is available for a sub-PU in the ATMVP candidate for a particular reference picture list. If so, the motion vector is considered to be available for that reference picture list. Otherwise, the motion vector is considered to be unavailable for that reference picture list. Alternatively, if a motion vector is available for the other reference picture list, motion compensation unit 44 may modify the motion information by scaling the motion vector to point to a target reference picture in the first reference picture list, as discussed above.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

In this manner, video encoder 20 of FIG. 2 represents an example of a video coder configured to form, for a current block of the video data, a merge candidate list including a plurality of merge candidates, the plurality of merge candidates including four spatial neighboring candidates from four neighboring blocks to the current block and, immediately following the four spatial neighboring candidates, an advanced temporal motion vector prediction (ATMVP) candidate, code an index into the merge candidate list that identifies a merge candidate of the plurality of merge candidates in the merge candidate list, and code the current block of video data using motion information of the identified merge candidate.

Figure 3:
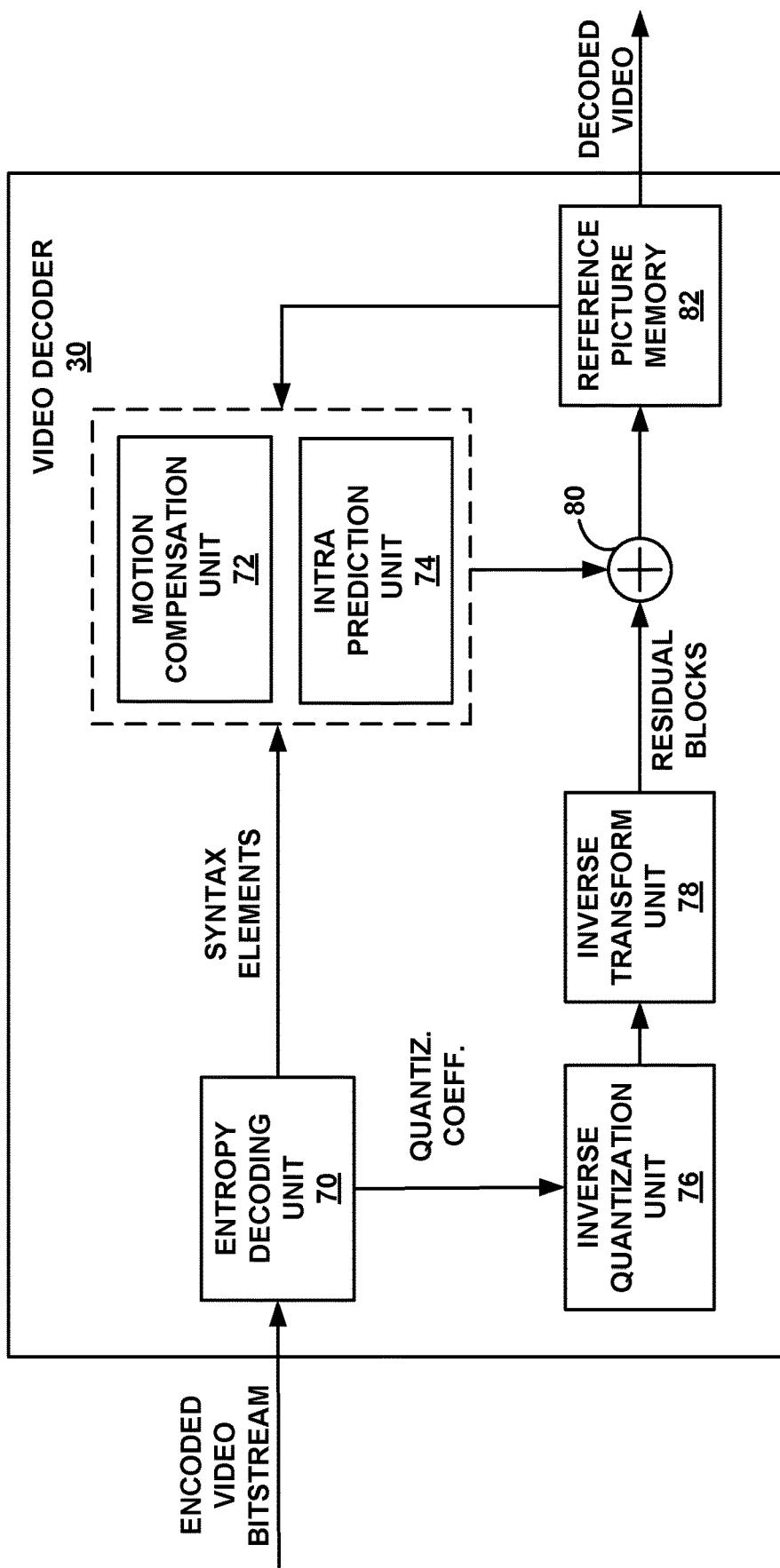
FIG. 3 is a block diagram illustrating an example of video decoder that may implement techniques for advanced temporal motion vector prediction (ATMVP).

FIG. 3 is a block diagram illustrating an example of video decoder 30 that may implement techniques for advanced temporal motion vector prediction (ATMVP). In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Video decoder 30 may be configured to perform any of the various techniques of this disclosure discussed above with respect to FIG. 1. For example, motion compensation unit 72 may be configured to determine whether motion information for a block of video data is coded using AMVP or merge mode in accordance with the techniques of this disclosure. More particularly, entropy decoding unit 70 may decode one or more syntax elements representing how motion information is coded for the current block.

Assuming that the syntax elements indicate that merge mode is performed, motion compensation unit 72 may form a candidate list including a set of merge candidates. Motion compensation unit 72 may add candidates to the candidate list based on a particular, predetermined order. In one example, motion compensation unit 72 adds the candidates to the candidate list in the order of A1, B1, B0, A0, then an advanced temporal motion vector prediction (ATMVP) candidate. Motion compensation unit 72 may also add additional candidates and perform pruning of the candidate list, as discussed above. Ultimately, motion compensation unit 72 may decode a merge index representing which of the candidates is used to code motion information for the current block.

Furthermore, in some examples, motion compensation unit 72 may first determine whether the ATMVP candidate is available. For example, motion compensation unit may determine a corresponding block to the current block in a reference picture and determine whether motion information is available for the corresponding block. Motion compensation unit 72 may then determine that the ATMVP candidate (that is, the corresponding block) is available when motion information is available for the corresponding block. In some examples, motion compensation unit 72 may determine that motion information is available for the corresponding block when the entire corresponding block is predicted without the use of intra-prediction, but is not available when at least part of the corresponding block is predicted using intra-prediction.

Similarly, in some examples, motion compensation unit 72 may determine which of two potential ATMVP candidates should be used as the ATMVP candidate ultimately added to the candidate list. For example, motion compensation unit 72 may form a first temporal motion vector relative to the current block that identifies a first ATMVP candidate in a first motion source picture, that is, a first reference picture. If motion information is not available for the first ATMVP candidate, motion compensation unit 72 may determine whether motion information is available for a second, different ATMVP candidate. The second ATMVP candidate may be identified using the same temporal motion vector referring to a second, different reference picture, a different temporal motion vector referring to the same (i.e. first) reference picture, or a different temporal motion vector referring to the second, different reference picture. The reference pictures to be checked, as discussed above, may be in ascending order of a reference indexes in a reference picture list. Likewise, if different temporal motion vectors are used, the temporal motion vectors may be selected in a predetermined order from temporal vectors of neighboring blocks to the current block.

Furthermore, motion compensation unit 72 may determine whether a motion vector is available for a sub-PU in the ATMVP candidate for a particular reference picture list. If so, the motion vector is considered to be available for that reference picture list. Otherwise, the motion vector is considered to be unavailable for that reference picture list. Alternatively, if a motion vector is available for the other reference picture list, motion compensation unit 72 may modify the motion information by scaling the motion vector to point to a target reference picture in the first reference picture list, as discussed above.

Inverse quantization unit 76 inverse quantizes, i.e., de-quantizes, quantized transform coefficients provided in the bitstream and entropy decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

In this manner, video decoder 30 represents an example of a video coder configured to form, for a current block of the video data, a merge candidate list including a plurality of merge candidates, the plurality of merge candidates including four spatial neighboring candidates from four neighboring blocks to the current block and, immediately following the four spatial neighboring candidates, an advanced temporal motion vector prediction (ATMVP) candidate, code an index into the merge candidate list that identifies a merge candidate of the plurality of merge candidates in the merge candidate list, and code the current block of video data using motion information of the identified merge candidate.

Figure 4:
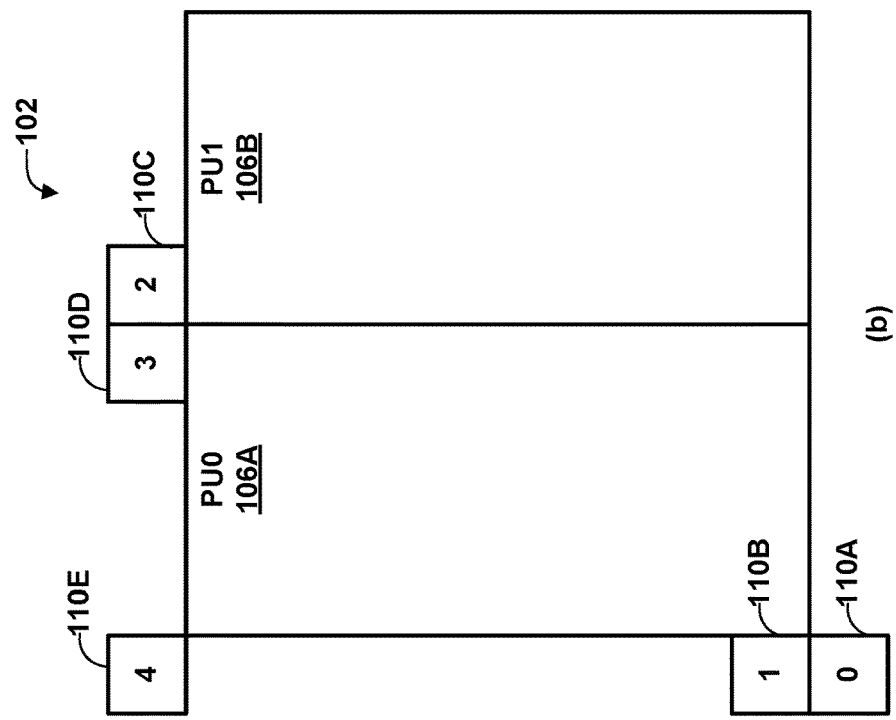
FIG. 4 is a conceptual diagram illustrating spatial neighboring candidates in High Efficiency Video Coding (HEVC).
Figure 4:
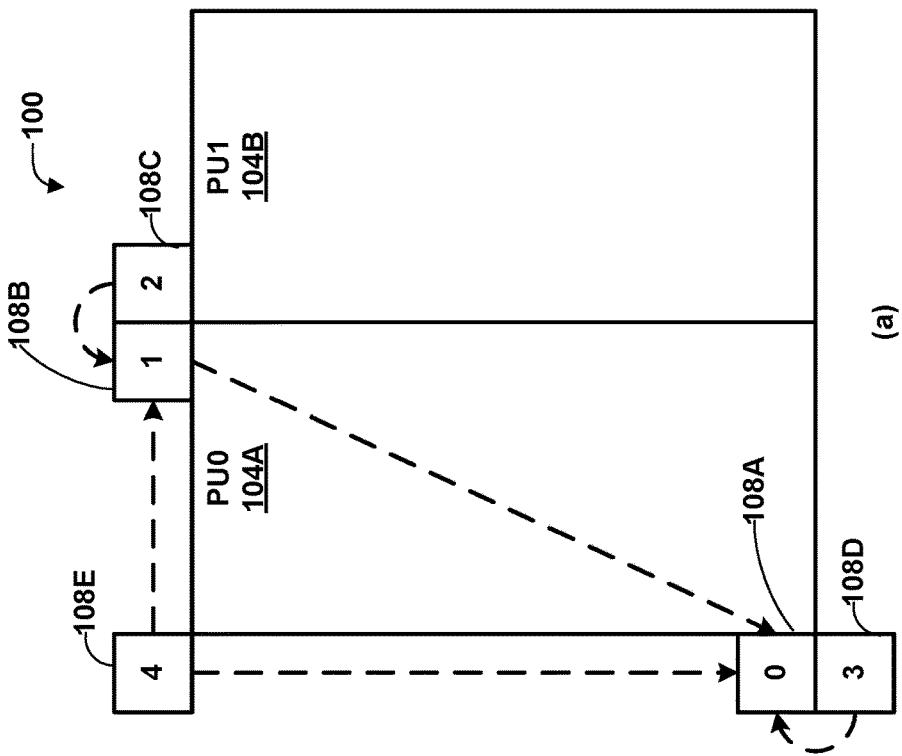

FIG. 4 is a conceptual diagram illustrating spatial neighboring candidates in HEVC. Spatial MV candidates are derived from the neighboring blocks shown on FIG. 4, for a specific PU (PU0), although the methods of generating the candidates from the blocks differ for merge and AMVP modes.

In merge mode, up to four spatial MV candidates can be derived with the orders shown in FIG. 4(a) with numbers, and the order is the following: left (0, A1), above (1, B1), above-right (2, B0), below-left (3, A0), and above left (4, B2), as shown in FIG. 4 (a). That is, in FIG. 4(a), block 100 includes PU0 104A and PU1 104B. When a video coder is to code motion information for PU0 104A using merge mode, the video coder adds motion information from spatial neighboring blocks 108A, 108B, 108C, 108D, and 108E to a candidate list, in that order. Blocks 108A, 108B, 108C, 108D, and 108E may also be referred to as, respectively, blocks A1, B1, B0, A0, and B2, as in HEVC.

In AVMP mode, the neighboring blocks are divided into two groups: a left group including blocks 0 and 1, and an above group including blocks 2, 3, and 4 as shown on FIG. 4 (b). These blocks are labeled, respectively, as blocks 110A, 110B, 110C, 110D, and 110E in FIG. 4(b). In particular, in FIG. 4(b), block 102 includes PU0 106A and PU1 106B, and blocks 110A, 110B, 110C, 110D, and 110E represent spatial neighbors to PU0 106A. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate; thus, the temporal distance differences can be compensated.

Figure 5:
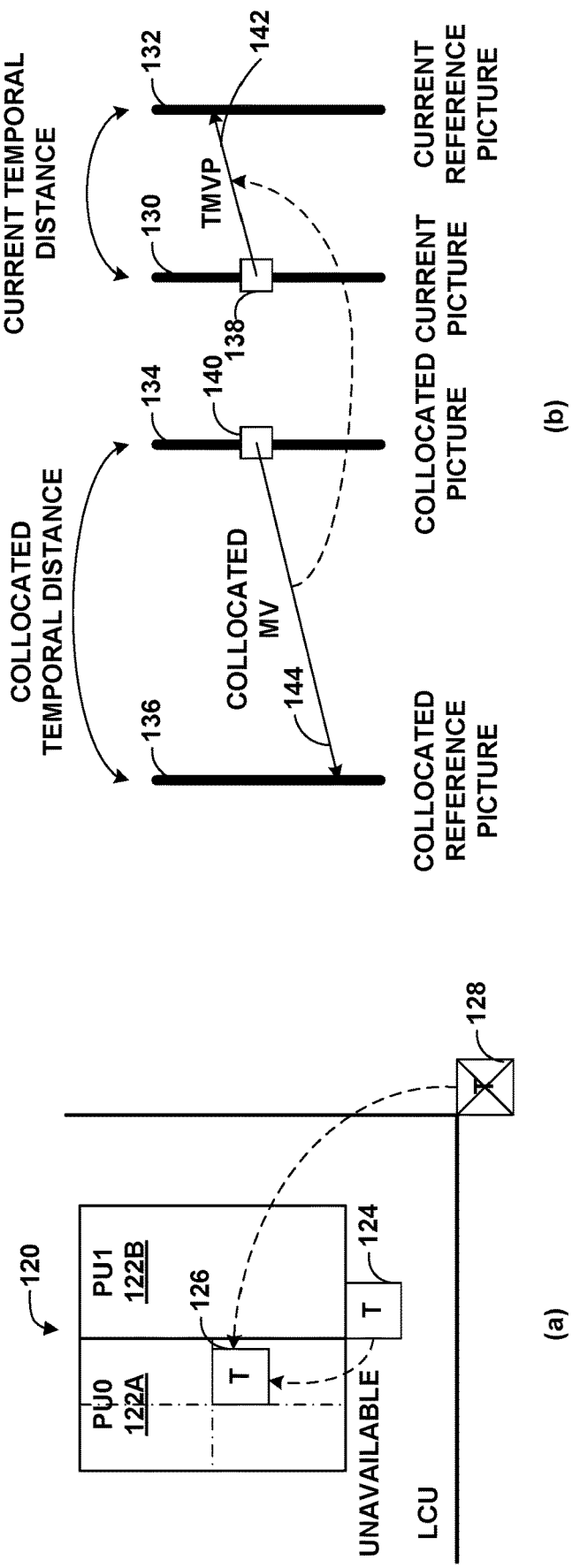
FIG. 5 is a conceptual diagram illustrating temporal motion vector prediction (TMVP) in HEVC.

FIG. 5 is a conceptual diagram illustrating temporal motion vector prediction in HEVC. In particular, FIG. 5(a) illustrates an example CU 120 including PU0 122A and PU 1 122B. PU0 122A includes a center block 126 for PU 122A and a bottom-right block 124 to PU0 122A. FIG. 5(a) also shows an external block 128 for which motion information may be predicted from motion information of PU0 122A, as discussed below. FIG. 5(b) illustrates a current picture 130 including a current block 138 for which motion information is to be predicted. In particular, FIG. 5(b) illustrates a collocated picture 134 to current picture 130 (including collocated block 140 to current block 138), a current reference picture 132, and a collocated reference picture 136. Collocated block 140 is predicted using motion vector 144, which is used as a temporal motion vector predictor (TMVP) 142 for motion information of block 138.

A video coder may add a TMVP candidate (e.g., TMVP candidate 142) into the MV candidate list after any spatial motion vector candidates if TMVP is enabled and the TMVP candidate is available. The process of motion vector derivation for the TMVP candidate is the same for both merge and AMVP modes. However, the target reference index for the TMVP candidate in the merge mode is set to 0, according to HEVC.

The primary block location for the TMVP candidate derivation is the bottom right block outside of the collocated PU, as shown in FIG. 5 (a) as block 124 to PU0 122A, to compensate the bias to the above and left blocks used to generate spatial neighboring candidates. However, if block 124 is located outside of the current CTB row or motion information is not available for block 124, the block is substituted with center block 126 of the PU as shown in FIG. 5(a).

The motion vector for TMVP candidate 142 is derived from co-located block 140 of co-located picture 134, as indicated in slice level information.

Similar to temporal direct mode in AVC, a motion vector of the TMVP candidate may be subject to motion vector scaling, which is performed to compensate picture order count (POC) distance differences between current picture 130 and current reference picture 132, and collocated picture 134 and collocated reference picture 136. That is, motion vector 144 may be scaled to produce TMVP candidate 142, based on these POC differences.

Several aspects of merge and AMVP modes of HEVC are discussed below.

Motion vector scaling: It is assumed that the value of a motion vector is proportional to the distance between pictures in presentation time. A motion vector associates two pictures: the reference picture and the picture containing the motion vector (namely the containing picture). When a motion vector is used by video encoder 20 or video decoder 30 to predict another motion vector, the distance between the containing picture and the reference picture is calculated based on Picture Order Count (POC) values.

For a motion vector to be predicted, its associated containing picture and reference picture are different. That is, there are two POC difference values for two distinct motion vectors: a first motion vector to be predicted, and a second motion vector used to predict the first motion vector. Moreover, the first POC difference is the difference between the current picture and the reference picture of the first motion vector, and the second POC difference is the difference between the picture containing the second motion vector and the reference picture to which the second motion vector refers. The second motion vector may be scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Artificial motion vector candidate generation: If a motion vector candidate list is not complete, artificial motion vector candidates may be generated and inserted at the end of the list until the list includes a predetermined number of candidates.

In merge mode, there are two types of artificial MV candidates: combined candidates derived only for B-slices and zero candidates used only for AMVP if the first type does not provide enough artificial candidates.

For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

Pruning process for candidate insertion: Candidates from different blocks may happen to be the same, which decreases the efficiency of a merge/AMVP candidate list. A pruning process may be applied to solve this problem. According to the pruning process, a video coder compares one candidate to the others in the current candidate list to avoid inserting an identical candidate, to a certain extent. To reduce the complexity, only limited numbers of pruning processes are applied, instead of comparing each potential candidate with all other existing candidates already in the list.

Figure 6:
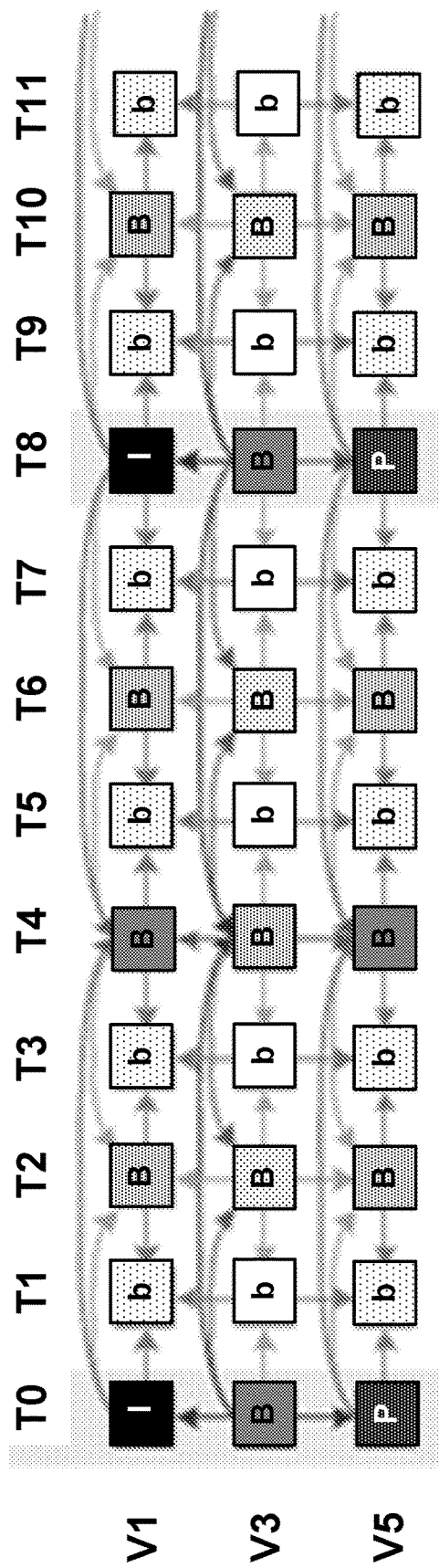
FIG. 6 is a conceptual diagram illustrating an example prediction structure for 3D-HEVC.

FIG. 6 illustrates an example prediction structure for 3D-HEVC. 3D-HEVC is a 3D video extension of HEVC under development by JCT-3V. Certain techniques related to the techniques of this disclosure are described with respect to FIGS. 6 and 7 below.

FIG. 6 shows a multiview prediction structure for a three-view case. V3 denotes the base view and a picture in a non-base view (V1 or V5) can be predicted from pictures in a dependent (base) view of the same time instance.

Figure 8:
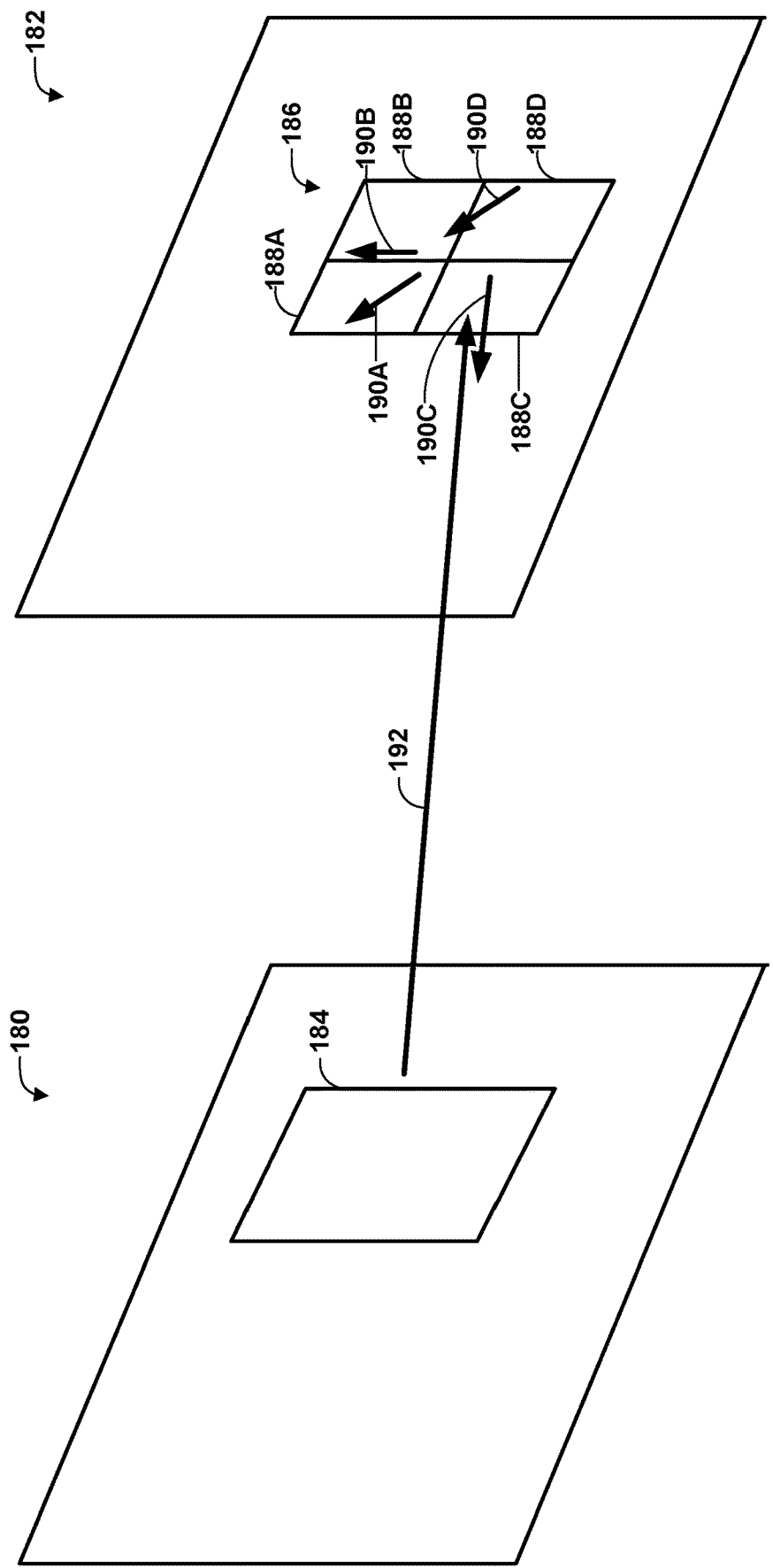
FIG. 8 is a conceptual diagram illustrating sub-PU motion prediction from a reference picture.

Inter-view sample prediction (from reconstructed samples) is supported in MV-HEVC, a typical prediction structure of which is shown in FIG. 8.

Both MV-HEVC and 3D-HEVC are compatible with HEVC in a way that the base (texture) view is decodable by HEVC (version 1) decoder. A test model for MV-HEVC and 3D-HEVC is described in Zhang et al., "Test Model 6 of 3D-HEVC and MV-HEVC," JCT-3V document ISO/IEC JTC1/SC29/WG11 N13940, available at the website mpeg.chiariglione.org/standards/mpeg-h/high-efficiency-video-coding/test-model-6-3d-hevc-and-mv-hevc as of Jan. 26, 2015.

In MV-HEVC, a current picture in a non-base view may be predicted by both pictures in the same view and pictures in a reference view of the same time instance, by putting all of these pictures in reference picture lists of the picture. Therefore, a reference picture list of the current picture contains both temporal reference pictures and inter-view reference pictures.

A motion vector associated with a reference index corresponding to a temporal reference picture is denoted a temporal motion vector.

A motion vector associated with a reference index corresponding to an inter-view reference picture is denoted a disparity motion vector.

3D-HEVC supports all features in MV-HEVC. Therefore, inter-view sample prediction as mentioned above is enabled.

In addition, more advanced texture only coding tools and depth related/dependent coding tools are supported.

The texture-only coding tools often require the identification of the corresponding blocks (between views) that may belong to the same object. Therefore, disparity vector derivation is a basic technology in 3D-HEVC.

Figure 7:
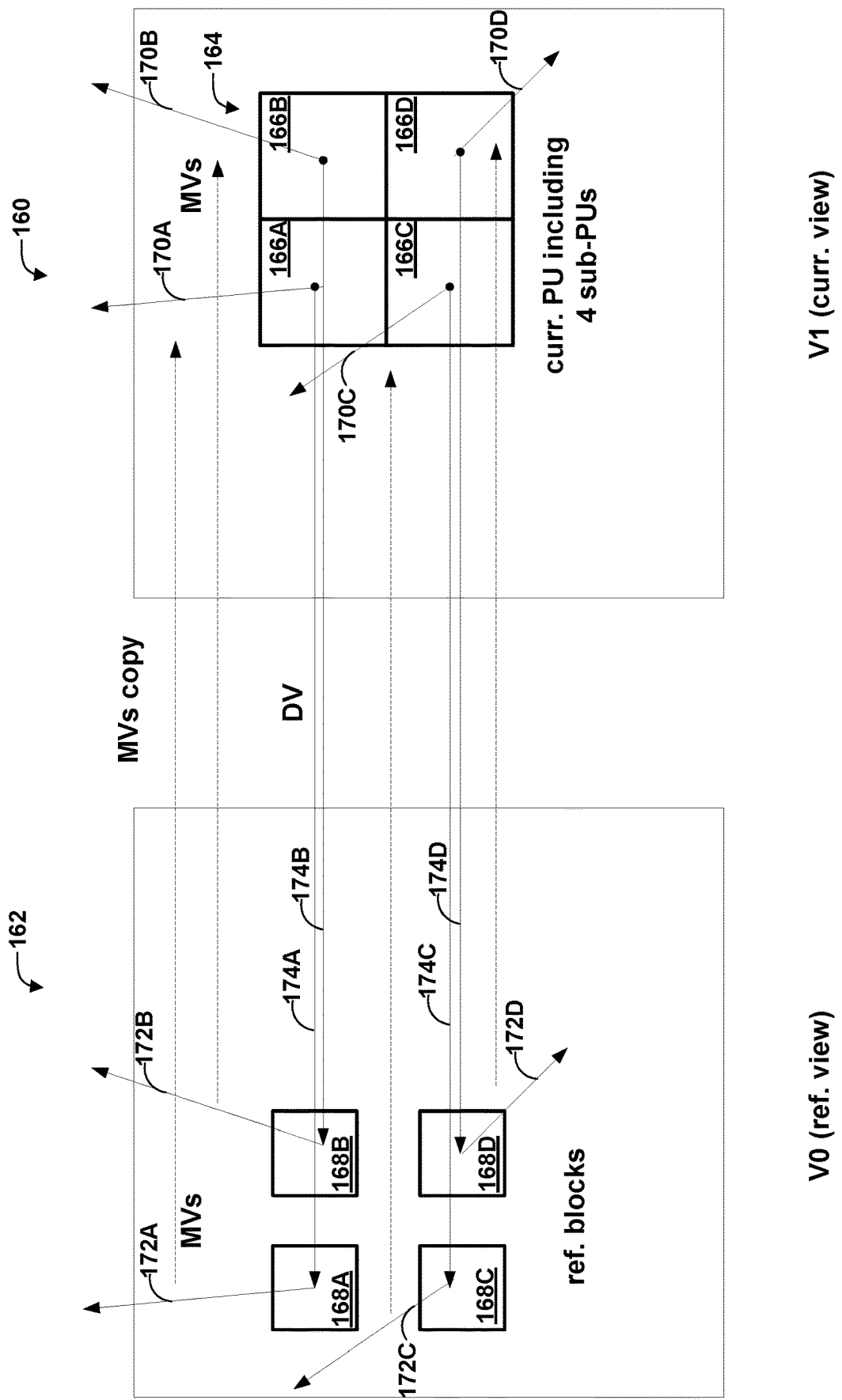
FIG. 7 is a conceptual diagram illustrating sub-PU based inter-view motion prediction in 3D-HEVC.

FIG. 7 is a conceptual diagram illustrating sub-PU based inter-view motion prediction in 3D-HEVC. FIG. 7 shows current picture 160 of a current view (V1) and a collocated picture 162 in a reference view (V0). Current picture 160 includes a current PU 164 including four sub-Pus 166A-166D (sub-PUs 166). Respective disparity vectors 174A-174D (disparity vectors 174) identify corresponding sub-PUs 168A-168D to sub-PUs 166 in collocated picture 162. In 3D-HEVC, a sub-PU level inter-view motion prediction method for the inter-view merge candidate, i.e., the candidate derived from a reference block in the reference view.

When such a mode is enabled, current PU 164 may correspond to a reference area (with the same size as current PU identified by the disparity vector) in the reference view and the reference area may have richer motion information than needed for generation one set of motion information typically for a PU. Therefore, a sub-PU level inter-view motion prediction (SPIVMP) method may be used, as shown in FIG. 7.

This mode may also be signaled as a special merge candidate. Each of the sub-PUs contains a full set of motion information. Therefore, a PU may contain multiple sets of motion information.

Sub-PU based motion parameter inheritance (MPI) in 3D-HEVC: Similarly, in 3D-HEVC, the MPI candidate can also be extended in a way similar to sub-PU level inter-view motion prediction. For example, if the current depth PU has a co-located region which contains multiple PUs, the current depth PU may be separated into sub-PUs, each may have a different set of motion information. This method is called sub-PU MPI. That is, motion vectors 172A-172D of corresponding sub-PUs 168A-168D may be inherited by sub-PUs 166A-166D, as motion vectors 170A-170D, as shown in FIG. 7.

Sub-PU related information for 2D video coding: In U.S. Patent Application Ser. No. 61/883,111, which is hereby incorporated by reference in its entirety, a sub-PU based advanced TMVP design is described. In single-layer coding, a two-stage advanced temporal motion vector prediction design is proposed.

A first stage is to derive a vector identifying the corresponding block of the current prediction unit (PU) in a reference picture, and a second stage is to extract multiple sets motion information from the corresponding block and assign them to sub-PUs of the PU. Each sub-PU of the PU therefore is motion compensated separately. The concept of the ATMVP is summarized as follows:
1. The vector in the first stage can be derived from spatial and temporal neighboring blocks of the current PU.
2. This process may be achieved as activating a merge candidate among all the other merge candidates.

Applicable to single-layer coding and sub-PU temporal motion vector prediction, a PU or CU may have motion refinement data to be conveyed on top of the predictors.

Several design aspects of the 61/883,111 application are highlighted as follows:
1. The first stage of vector derivation can also be simplified by just a zero vector.
2. The first stage of vector derivation may include identifying jointly the motion vector and its associated picture. Various ways of selecting the associated picture and further deciding the motion vector to be the first stage vector have been proposed.
3. If the motion information during the above process is unavailable, the "first stage vector" is used for substitution.
4. A motion vector identified from a temporal neighbor has to be scaled to be used for the current sub-PU, in a way similar to motion vector scaling in TMVP. However, which reference picture such a motion vector may be scaled to can be designed with one of the following ways:
   a. The picture is identified by a fixed reference index of the current picture.
   b. The picture is identified to be the reference picture of the corresponding temporal neighbor, if also available in a reference picture list of the current picture.
   c. The picture is set to be the co-located picture identified in the first stage and from where the motion vectors are grabbed from.

FIG. 8 is a conceptual diagram illustrating sub-PU motion prediction from a reference picture. In this example, current picture 180 includes a current PU 184 (e.g., a PU). In this example, motion vector 192 identifies PU 186 of reference picture 182 relative to PU 184. PU 186 is partitioned into sub-PUs 188A-188D, each having respective motion vectors 190A-190D. Thus, although current PU 184 is not actually partitioned into separate sub-PUs, in this example, current PU 184 may be predicted using motion information from sub-PUs 188A-188D. In particular, a video coder may code sub-PUs of current PU 184 using respective motion vectors 190A-190D. However, the video coder need not code syntax elements indicating that current PU 184 is split into sub-PUs. In this manner, current PU 184 may be effectively predicted using multiple motion vectors 190A-190D, inherited from respective sub-PUs 188A-188D, without the signaling overhead of syntax elements used to split current PU 184 into multiple sub-PUs.

FIG. 9 is a conceptual diagram illustrating relevant pictures in ATMVP (similar to TMVP). In particular, FIG. 9 illustrates current picture 204, motion source picture 206, and reference pictures 200, 202. More particularly, current picture 204 includes current block 208. Temporal motion vector 212 identifies corresponding block 210 of motion source picture 206 relative to current block 208. Corresponding block 210, in turn, includes motion vector 214, which refers to reference picture 202 and acts as an advanced temporal motion vector predictor for at least a portion of current block 208, e.g., a sub-PU of current block 208. That is, motion vector 214 may be added as a candidate motion vector predictor for current block 208. If selected, at least a portion of current block 208 may be predicted using a corresponding motion vector, namely, motion vector 216, which refers to reference picture 200.

Figure 10:
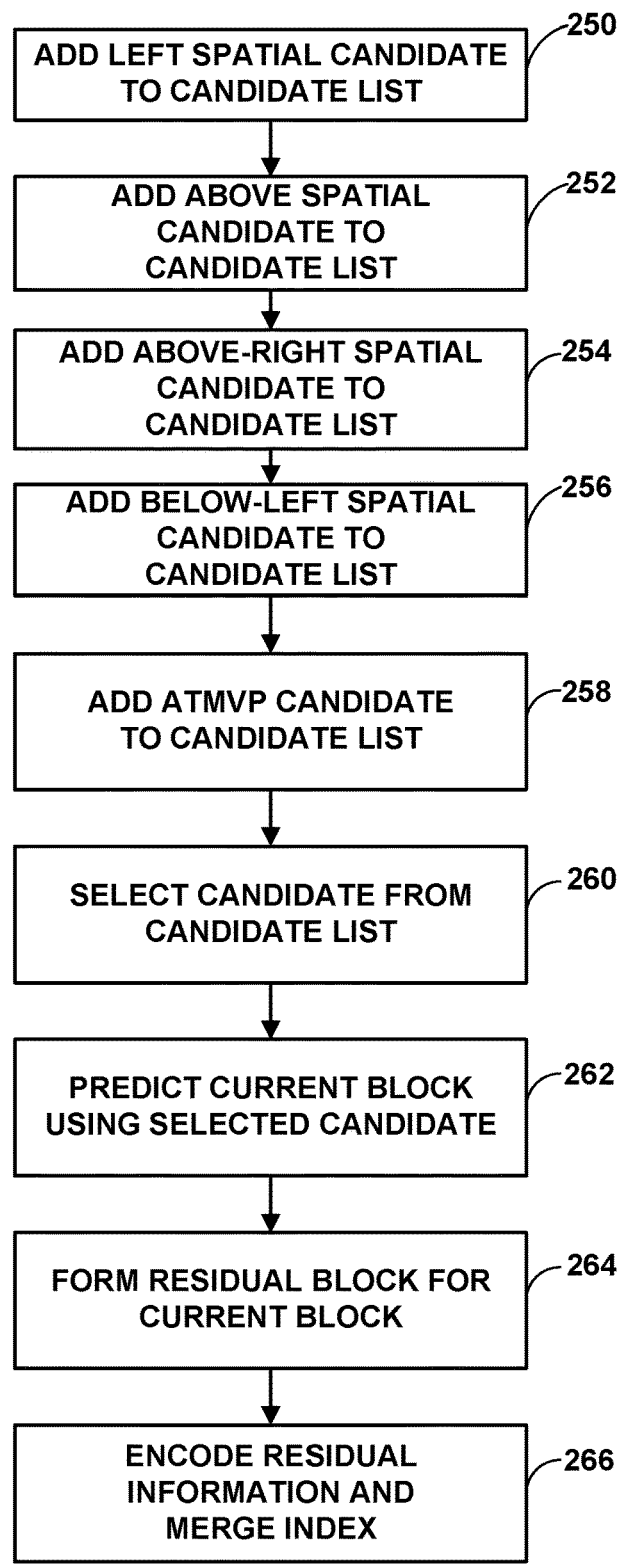
FIG. 10 is a flowchart illustrating an example method for adding an ATMVP candidate to a candidate list during an encoding process in accordance with the techniques of this disclosure.

FIG. 10 is a flowchart illustrating an example method for adding an ATMVP candidate to a candidate list during an encoding process in accordance with the techniques of this disclosure. The method of FIG. 10 is described as being performed by video encoder 20 (FIGS. 1 and 2). It should be understood, however, that other encoding devices may be configured to perform this or a similar method.

Initially, video encoder 20 obtains a block of video data to be encoded (not shown in FIG. 10). The block may include a set of spatial neighbors, such as those shown in FIG. 4(a) and FIG. 4(b). Motion compensation unit 44 may construct the candidate list by first adding a left spatial candidate to the candidate list (250). That is, with respect to FIG. 4(a), assuming PU0 104A is the block to be encoded, video encoder 20 may first insert spatial neighbor 108A into the candidate list.

Next, motion compensation unit 44 may add the above spatial candidate to the candidate list (252). With respect to FIG. 4(a), video encoder 20 may insert spatial neighbor 108B into the candidate list.

Next, motion compensation unit 44 may add the above-right spatial candidate to the candidate list (254). With respect to FIG. 4(a), video encoder 20 may insert spatial neighbor 108C into the candidate list.

Next, motion compensation unit 44 may add the below-left spatial candidate to the candidate list (256). With respect to FIG. 4(a), video encoder 20 may insert spatial neighbor 108D into the candidate list.

Next, motion compensation unit 44 may add an advanced temporal motion vector predictor (ATMVP) candidate into the candidate list (258). As discussed above, the ATMVP candidate may represent a corresponding block identified by a temporal vector as shown in and discussed with respect to, e.g., FIGS. 8 and 9. Furthermore, in some examples, motion compensation unit 44 may first determine whether the ATMVP candidate is available. For example, motion compensation unit may determine a corresponding block to the current block in a reference picture and determine whether motion information is available for the corresponding block. Motion compensation unit 44 may then determine that the ATMVP candidate (that is, the corresponding block) is available when motion information is available for the corresponding block. In some examples, motion compensation unit 44 may determine that motion information is available for the corresponding block when the entire corresponding block is predicted without the use of intra-prediction, but is not available when at least part of the corresponding block is predicted using intra-prediction.

Similarly, in some examples, motion compensation unit 44 may determine which of two potential ATMVP candidates should be used as the ATMVP candidate ultimately added to the candidate list. For example, motion compensation unit 44 may form a first temporal motion vector relative to the current block that identifies a first ATMVP candidate in a first motion source picture, that is, a first reference picture. If motion information is not available for the first ATMVP candidate, motion compensation unit 44 may determine whether motion information is available for a second, different ATMVP candidate. The second ATMVP candidate may be identified using the same temporal motion vector referring to a second, different reference picture, a different temporal motion vector referring to the same (i.e., first) reference picture, or a different temporal motion vector referring to the second, different reference picture. The reference pictures to be checked, as discussed above, may be in ascending order of a reference indexes in a reference picture list. Likewise, if different temporal motion vectors are used, the temporal motion vectors may be selected in a predetermined order from temporal vectors of neighboring blocks to the current block.

Furthermore, motion compensation unit 44 may determine whether a motion vector is available for a sub-PU in the ATMVP candidate for a particular reference picture list. If so, the motion vector is considered to be available for that reference picture list. Otherwise, the motion vector is considered to be unavailable for that reference picture list. Alternatively, if a motion vector is available for the other reference picture list, motion compensation unit 44 may modify the motion information by scaling the motion vector to point to a target reference picture in the first reference picture list, as discussed above.

Video encoder 20 may then select one of the candidates from the candidate list (260). For example, video encoder 20 may test encoding of the block using any or all of the candidates in the candidate list. Additionally or alternatively, motion estimation unit 42 of video encoder 20 may perform a motion search and determine a motion vector for the block, and determine whether to encode the motion vector using advanced motion vector prediction (AMVP) or merge mode. In the example of FIG. 10, it is assumed that video encoder 20 has elected to encode motion information using merge mode. In general, video encoder 20 (more particularly, mode select unit 40) may determine which of the candidates in the candidate list yields the best rate-distortion characteristics, and select that candidate to be used to predict the block.

Accordingly, video encoder 20 may predict the current block using the selected candidate (262). That is, motion compensation unit 44 may retrieve one or more reference blocks identified by motion information of the selected candidate, and in some examples may interpolate values for fractional pixels, if the motion information has sub-pixel precision.

Video encoder 20 may then form a residual block for the current block (264). As discussed above, summer 50 may calculate pixel-by-pixel differences between the current block and the predicted block, forming the residual block. Video encoder 20 may then encode residual information of the residual block and encode a merge index (266). That is, transform processing unit 52 may transform the residual block, to produce transform coefficients representing the residual information. Quantization unit 54 may then quantize the transform coefficients. Entropy encoding unit 56 may then entropy encode the quantized transform coefficients, as well as syntax elements representative of the motion information coding mode (merge mode, in this example), and the merge index representing the selected candidate from the candidate list.

In this manner, the method of FIG. 10 represents an example of a method including forming, for a current block of video data, a merge candidate list including a plurality of merge candidates, the plurality of merge candidates including four spatial neighboring candidates from four neighboring blocks to the current block and, immediately following the four spatial neighboring candidates, an advanced temporal motion vector prediction (ATMVP) candidate, coding an index into the merge candidate list that identifies a merge candidate of the plurality of merge candidates in the merge candidate list, and coding the current block of video data using motion information of the identified merge candidate.

Figure 11:
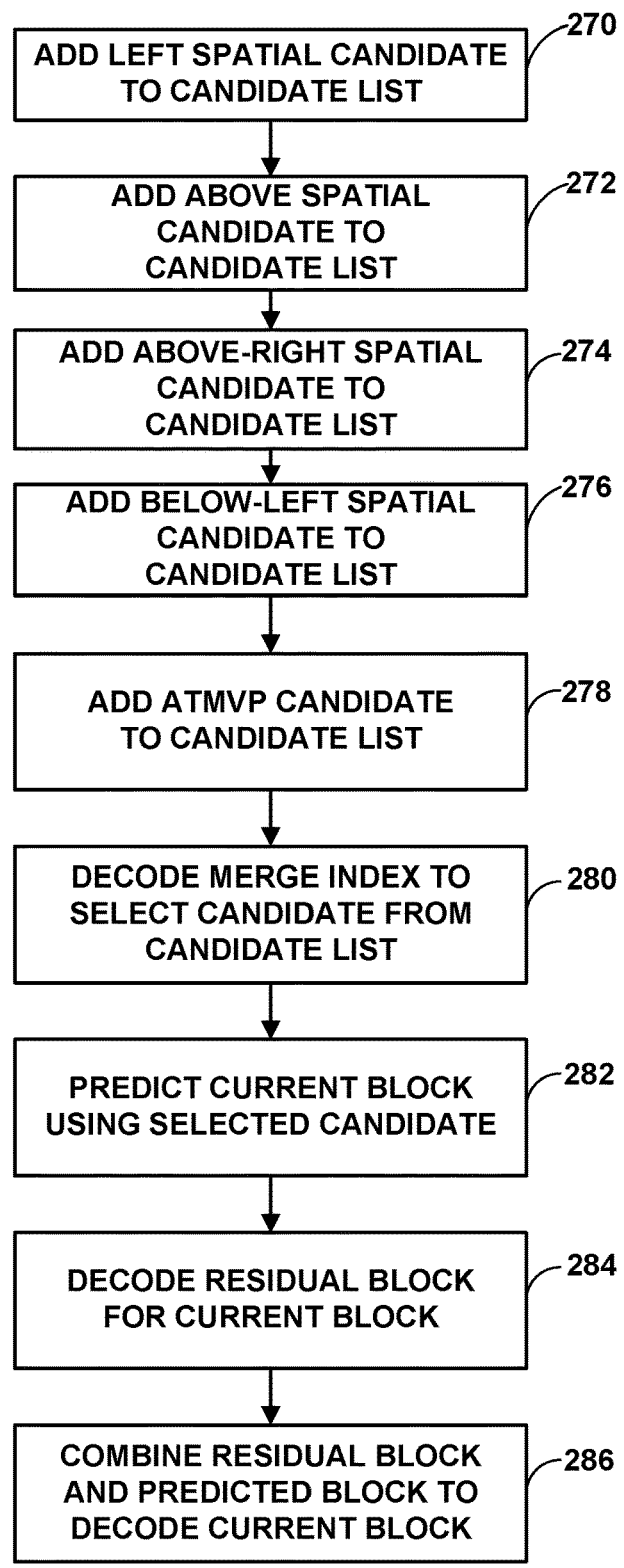
FIG. 11 is a flowchart illustrating an example method for adding an ATMVP candidate to a candidate list during a decoding process in accordance with the techniques of this disclosure.

FIG. 11 is a flowchart illustrating an example method for adding an ATMVP candidate to a candidate list during a decoding process in accordance with the techniques of this disclosure. The method of FIG. 11 is described as being performed by video decoder 30 (FIGS. 1 and 3). It should be understood, however, that other decoding devices may be configured to perform this or a similar method.

Initially, video decoder 30 obtains a block of video data to be encoded (not shown in FIG. 11). The block may include a set of spatial neighbors, such as those shown in FIG. 4(*a*) and FIG. 4(*b*). Motion compensation unit 72 may construct the candidate list by first adding a left spatial candidate to the candidate list (270). That is, with respect to FIG. 4(*a*), assuming PU0 104A is the block to be encoded, video decoder 30 may first insert spatial neighbor 108A into the candidate list.

Next, motion compensation unit 72 may add the above spatial candidate to the candidate list (272). With respect to FIG. 4(*a*), video decoder 30 may insert spatial neighbor 108B into the candidate list.

Next, motion compensation unit 72 may add the above-right spatial candidate to the candidate list (274). With respect to FIG. 4(*a*), video decoder 30 may insert spatial neighbor 108C into the candidate list.

Next, motion compensation unit 72 may add the below-left spatial candidate to the candidate list (276). With respect to FIG. 4(*a*), video decoder 30 may insert spatial neighbor 108D into the candidate list.

Next, motion compensation unit 72 may add an advanced temporal motion vector predictor (ATMVP) candidate into the candidate list (278). As discussed above, the ATMVP candidate may represent a corresponding block identified by a temporal vector as shown in and discussed with respect to, e.g., FIGS. 8 and 9. Furthermore, in some examples, motion compensation unit 72 may first determine whether the ATMVP candidate is available. For example, motion compensation unit may determine a corresponding block to the current block in a reference picture and determine whether motion information is available for the corresponding block. Motion compensation unit 72 may then determine that the ATMVP candidate (that is, the corresponding block) is available when motion information is available for the corresponding block. In some examples, motion compensation unit 72 may determine that motion information is available for the corresponding block when the entire corresponding block is predicted without the use of intra-prediction, but is not available when at least part of the corresponding block is predicted using intra-prediction.

Similarly, in some examples, motion compensation unit 72 may determine which of two potential ATMVP candidates should be used as the ATMVP candidate ultimately added to the candidate list. For example, motion compensation unit 72 may form a first temporal motion vector relative to the current block that identifies a first ATMVP candidate in a first motion source picture, that is, a first reference picture. If motion information is not available for the first ATMVP candidate, motion compensation unit 72 may determine whether motion information is available for a second, different ATMVP candidate. The second ATMVP candidate may be identified using the same temporal motion vector referring to a second, different reference picture, a different temporal motion vector referring to the same (i.e., first) reference picture, or a different temporal motion vector referring to the second, different reference picture. The reference pictures to be checked, as discussed above, may be in ascending order of a reference indexes in a reference picture list. Likewise, if different temporal motion vectors are used, the temporal motion vectors may be selected in a predetermined order from temporal vectors of neighboring blocks to the current block.

Furthermore, motion compensation unit 72 may determine whether a motion vector is available for a sub-PU in the ATMVP candidate for a particular reference picture list. If so, the motion vector is considered to be available for that reference picture list. Otherwise, the motion vector is considered to be unavailable for that reference picture list. Alternatively, if a motion vector is available for the other reference picture list, motion compensation unit 72 may modify the motion information by scaling the motion vector to point to a target reference picture in the first reference picture list, as discussed above.

Video decoder 30 may then decode a merge index to select one of the candidates from the candidate list (280). More particularly, entropy decoding unit 70 of video decoder 30 may entropy decode one or more syntax elements representing whether motion information of a current block is encoded using merge mode, as well as a merge index representing a selected candidate from the candidate list.

Accordingly, video decoder 30 may predict the current block using the selected candidate (282). That is, motion compensation unit 72 may retrieve one or more reference blocks identified by motion information of the selected candidate, and in some examples may interpolate values for fractional pixels, if the motion information has sub-pixel precision.

Video decoder 30 may also decode a residual block for the current block (284). In particular, entropy decoding unit 70 may decode quantized transform coefficients, which inverse quantization unit 76 may inverse quantize to form a transform block. Inverse transform unit 78 may then inverse transform the transform block to reproduce the residual block. Summer 80 may then combine the predicted block with the residual block to decode the current block (286), in particular, by reconstructing the current block.

In this manner, the method of FIG. 11 represents an example of a method including forming, for a current block of video data, a merge candidate list including a plurality of merge candidates, the plurality of merge candidates including four spatial neighboring candidates from four neighboring blocks to the current block and, immediately following the four spatial neighboring candidates, an advanced temporal motion vector prediction (ATMVP) candidate, coding an index into the merge candidate list that identifies a merge candidate of the plurality of merge candidates in the merge candidate list, and coding the current block of video data using motion information of the identified merge candidate.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   forming, for a current block of video data, a merge candidate list including a plurality of merge candidates, the plurality of merge candidates including four spatial neighboring candidates from four neighboring blocks to the current block and, immediately following the four spatial neighboring candidates, an advanced temporal motion vector prediction (ATMVP) candidate, wherein the ATMVP candidate indicates that the current block is to be predicted using a block identified by the ATMVP candidate that is split into a plurality of sub-blocks, each of the plurality of sub-blocks having a respective set of motion information;
   coding an index into the merge candidate list that identifies the ATMVP candidate of the plurality of merge candidates in the merge candidate list; and
   based on the index identifying the ATMVP candidate, coding the current block of video data, wherein coding the current block comprises coding sub-blocks of the current block using the respective motion information of the sub-blocks of the block identified by the ATMVP candidate.

2. The method of claim 1, wherein forming the merge candidate list comprises:
   determining, for the current block, a corresponding block in a reference picture;
   determining whether motion information is available for the corresponding block; and
   forming the merge candidate list to include the ATMVP candidate after determining that motion information is available for the corresponding block.

3. The method of claim 2, wherein determining whether motion information is available for the corresponding block comprises determining whether a portion of the corresponding block is intra-predicted.

4. A device for coding video data, the device comprising:
   a memory configured to store video data; and
   a video coder configured to:
      form, for a current block of the video data, a merge candidate list including a plurality of merge candidates, the plurality of merge candidates including four spatial neighboring candidates from four neighboring blocks to the current block and, immediately following the four spatial neighboring candidates, an advanced temporal motion vector prediction (ATMVP) candidate, wherein the ATMVP candidate indicates that the current block is to be predicted using a block identified by the ATMVP candidate that is split into a plurality of sub-blocks, each of the plurality of sub-blocks having a respective set of motion information;
      code an index into the merge candidate list that identifies the ATMVP candidate of the plurality of merge candidates in the merge candidate list; and
      based on the index identifying the ATMVP candidate, code the current block of video data, wherein to code the current block of video data, the video coder is configured to code sub-blocks of the current block using the respective motion information of the sub-blocks of the block identified by the ATMVP candidate.

5. The device of claim 4, wherein to form the merge candidate list, the video coder is configured to:
   determine, for the current block, a corresponding block in a reference picture;
   determine whether motion information is available for the corresponding block; and
   form the merge candidate list to include the ATMVP candidate after determining that motion information is available for the corresponding block.

6. The device of claim 5, wherein to determine whether motion information is available for the corresponding block, the video coder is configured to determine whether a portion of the corresponding block is intra-predicted.

7. A device for coding video data, the device comprising:
   means for forming, for a current block of video data, a merge candidate list including a plurality of merge candidates, the plurality of merge candidates including four spatial neighboring candidates from four neighboring blocks to the current block and, immediately following the four spatial neighboring candidates, an advanced temporal motion vector prediction (ATMVP) candidate, wherein the ATMVP candidate indicates that the current block is to be predicted using a block identified by the ATMVP candidate that is split into a plurality of sub-blocks, each of the plurality of sub-blocks having a respective set of motion information;
   means for coding an index into the merge candidate list that identifies the ATMVP candidate of the plurality of merge candidates in the merge candidate list; and
   means for coding the current block of video data, wherein the means for coding the current block of video data comprises means for coding sub-blocks of the current block using the respective motion information of the sub-blocks of the block identified by the ATMVP candidate based on the index identifying the ATMVP candidate.

8. The device of claim 7, wherein forming the merge candidate list comprises:
   means for determining, for the current block, a corresponding block in a reference picture;
   means for determining whether motion information is available for the corresponding block; and
   means for forming the merge candidate list to include the ATMVP candidate after determining that motion information is available for the corresponding block.

9. The device of claim 8, wherein the means for determining whether motion information is available for the corresponding block comprises means for determining whether a portion of the corresponding block is intra-predicted.

10. A non-transitory computer-readable storage medium having stored thereon instructions that, when executed, cause a processor to:
   form, for a current block of video data, a merge candidate list including a plurality of merge candidates, the plurality of merge candidates including four spatial neighboring candidates from four neighboring blocks to the current block and, immediately following the four spatial neighboring candidates, an advanced temporal motion vector prediction (ATMVP) candidate, wherein the ATMVP candidate indicates that the current block is to be predicted using a block identified by the ATMVP candidate that is split into a plurality of sub-blocks, each of the plurality of sub-blocks having a respective set of motion information;

code an index into the merge candidate list that identifies the ATMVP candidate of the plurality of merge candidates in the merge candidate list; and based on the index identifying the ATMVP candidate, code the current block of video data, wherein the instructions that cause the processor to code the current block comprise instructions that cause the processor to code sub-blocks of the current block using the respective motion information of the sub-blocks of the block identified by the ATMVP candidate.

11. The non-transitory computer-readable storage medium of claim 10, wherein the instructions that cause the processor to form the merge candidate list comprise instructions that cause the processor to:

determine, for the current block, a corresponding block in a reference picture;

determine whether motion information is available for the corresponding block; and form the merge candidate list to include the ATMVP candidate after determining that motion information is available for the corresponding block.

12. The non-transitory computer-readable storage medium of claim 11, wherein the instructions that cause the processor to determine whether motion information is available for the corresponding block comprise instructions that cause the processor to determining whether a portion of the corresponding block is intra-predicted.

* * * * *